US006629795B2

(12) United States Patent
Kinoshita et al.

(10) Patent No.: US 6,629,795 B2
(45) Date of Patent: Oct. 7, 2003

(54) IMAGE FORMATION APPARATUS

(75) Inventors: Hiroki Kinoshita, Yamatokoriyama (JP); Kazunori Soda, Tenri (JP); Yoshifumi Maitani, Nara (JP); Hideki Sekino, Yamatokoriyama (JP); Masayuki Gomi, Kashihara (JP); Masahiro Kitajiri, Kashiwara (JP); Takehiro Katoh, Nara (JP); Noritomo Nakashima, Kashihara (JP); Yasuhiro Inoue, Yamatokoriyama (JP); Yoshio Nishimoto, Kyoto (JP); Yukinari Satou, Kyoto (JP); Norihide Momose, Yamatokoriyama (JP)

(73) Assignee: Sharp Kabushiki Kaisha, Osaka (JP)

( * ) Notice: Subject to any disclaimer, the term of this patent is extended or adjusted under 35 U.S.C. 154(b) by 416 days.

(21) Appl. No.: 09/800,424

(22) Filed: Mar. 6, 2001

(65) Prior Publication Data

US 2001/0033050 A1 Oct. 25, 2001

(30) Foreign Application Priority Data

| | | |
|---|---|---|
| Mar. 10, 2000 | (JP) | 2000-066540 |
| May 19, 2000 | (JP) | 2000-148006 |
| Jul. 3, 2000 | (JP) | 2000-200649 |

(51) Int. Cl.[7] .......................... B41J 11/42; B65H 83/00; H04N 1/387

(52) U.S. Cl. ....................... 400/582; 271/3.17; 358/450

(58) Field of Search ................................. 400/582, 578, 400/599, 605, 61, 63, 64; 101/11, 37, 40, 40.1, 43, 44, 53, 224, 225, 227, 228, 231, 232, 272, 276, 278, 279; 399/76, 66, 388, 396, 397; 358/1.1, 1.2, 1.5, 1.6, 1.7, 2.1, 426.05, 448, 450, 452, 453; 700/11, 12, 13, 40, 64, 69, 131, 135, 171, 253; 271/3.06, 3.14, 3.17, 8.1, 9.01, 9.11, 104, 118, 121, 227, 258.01, 153, 265.01, 10.03, 10.09, 10.11, 10.13, 110, 111, 182, 202, 229, 258.03, 265, 266, 270, 272, 283

(56) References Cited

U.S. PATENT DOCUMENTS

| | | | | | |
|---|---|---|---|---|---|
| 5,197,726 | A | * | 3/1993 | Nogami | 271/110 |
| 5,512,927 | A | * | 4/1996 | Okamoto | 347/129 |

(List continued on next page.)

FOREIGN PATENT DOCUMENTS

| | | |
|---|---|---|
| JP | 62-62373 | 3/1987 |
| JP | 05-294496 | 11/1993 |

(List continued on next page.)

*Primary Examiner*—Andrew H. Hirshfeld
*Assistant Examiner*—Hoai-An D Nguyen
(74) *Attorney, Agent, or Firm*—Renner, Otto, Boisselle & Sklar, LLP

(57) ABSTRACT

An image forming apparatus includes an image forming unit, a paper transport unit, and a control unit for supplying the image forming unit with image data for a plurality of pages so that the image forming unit forms images page by page on sheets transported by the paper transport unit, wherein, when the image data for each page includes data representative of blanks on a leading end side and on a tail end side of the page in a paper transport direction, the control unit deletes the data representative of the blank either on the leading end side or on the tail end side from the image data prior to supplying the image forming unit with the image data, and controls the paper transport unit so that a plurality of sheets are transported sequentially to the image formation unit in a multiple state in which one sheet partially overlaps with another in the paper transport direction by a length corresponding to the deleted data representative of the blank.

20 Claims, 27 Drawing Sheets

U.S. PATENT DOCUMENTS

| | | | | | |
|---|---|---|---|---|---|
| 6,134,339 | A | * | 10/2000 | Luo | 382/115 |
| 6,409,043 | B1 | * | 6/2002 | Fujita et al. | 271/10.03 |
| 6,477,339 | B1 | * | 11/2002 | Yano et al. | 399/66 |
| 6,533,263 | B2 | * | 3/2003 | Tamura | 271/10.01 |

FOREIGN PATENT DOCUMENTS

| | | |
|---|---|---|
| JP | 09-314993 | 12/1997 |
| JP | 11-202683 | 7/1999 |

* cited by examiner

IMAGE FORMATION APPARATUS

CROSS-REFERENCES TO RELATED APPLICATIONS

This application is related to Japanese Patent Applications Nos. 2000-66540, 2000-148006 and 2000-200649, filed on Mar. 10, 2000, May 19, 2000 and Jul. 3, 2000 whose priorities are claimed under 35 USC §119, the disclosures of which are incorporated by reference in their entirety.

BACKGROUND OF THE INVENTION

1. Field of the Invention

The present invention relates to an image forming apparatus such as a copier, a facsimile machine, a printer or the like which forms images on paper fed from a paper feed section by its image forming section, more particularly, an image forming apparatus which is adapted to form images continuously on a plurality of sheets of paper in a multiple state in which the sheets are partially overlapped with each other.

2. Description of Related Art

Image forming apparatus such copiers, printers and the like are strongly desired to form images in a shorter time. For this purpose, in some conventional image forming apparatus, as disclosed by Japanese Unexamined Patent Publication Nos. HEI 9(1997)-314993 and HEI 11(1999)-202683, when images are formed continuously on a plurality of sheets of paper, the sheets are transported at shortened intervals, and thereby is shortened a time necessary for the sheets from the leading end of the first sheet to the tail end of the last sheet to pass through an image forming section. Thus, a time required for an image forming operation is reduced without increasing an image forming speed. An increase in the image forming speed causes deterioration in the state of formed images.

Particularly, in constructions disclosed by Japanese Unexamined Patent Publication Nos. HEI 5(1993)-294496 and SHO 62(1987)-62373, a plurality of sheets of paper are transported to an image forming section with being overlapped with each other by a predetermined length, and thereby a time necessary for the sheets to pass through the image forming section is further shortened.

However, in the constructions disclosed by Japanese Unexamined Patent Publication Nos. HEI 5(1993)-294496 and SHO 62(1987)-62373, the length by which the sheets are overlapped with each other in a paper transport direction is not clearly specified. If this length is constant, the sheets can be overlapped only within a range of so-called voids of the sheets where images are never formed, for avoiding possible failure in image formation on the overlapped sheets, because images to be formed on the sheets have different lengths in the paper transport direction. Therefore, there is a problem that the time necessary for a plurality of sheets to pass through the image forming section cannot be shortened sufficiently.

Also, in an image forming apparatus which forms images on an electrophotographic system, sheets of paper having images of a developer transferred thereon need to be heated and pressurized at a fixing section. If two sheets partially overlapped with each other are passed through the fixing section, the two sheets adhere to each other and cannot be sent out of the apparatus smoothly.

SUMMARY OF THE INVENTION

An object of the present invention is to provide an image forming apparatus which allows the time for the image forming operation to be shortened by deleting blanks in a paper transport direction from data of images to be formed continuously, overlapping sheets of paper positioned ahead and behind in the paper transport direction by overlap amounts according to the length of the deleted blanks and reducing the time for the sheets to pass through an image forming unit to a minimum according to the length of the images to be formed on the sheets. The image forming apparatus can also separate the sheets from each other before the sheets reach a fixing section to prevent the sheets from adhering.

The present invention provides an image forming apparatus comprising: an image forming unit; a paper transport unit; and a control unit for supplying the image forming unit with image data for a plurality of pages so that the image forming unit forms images page by page on sheets transported by the paper transport unit, wherein, when the image data for each page includes data representative of blanks on a leading end side and on a tail end side of the page in a paper transport direction, the control unit deletes the data representative of the blank either on the leading end side or on the tail end side from the image data prior to supplying the image forming unit with the image data, and controls the paper transport unit so that a plurality of sheets are transported sequentially to the image formation unit in a multiple state in which one sheet partially overlaps with another in the paper transport direction by a length corresponding to the deleted data representative of the blank.

These and other objects of the present application will become more readily apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

DESCRIPTION OF THE PREFERRED EMBODIMENTS

Figure 1:
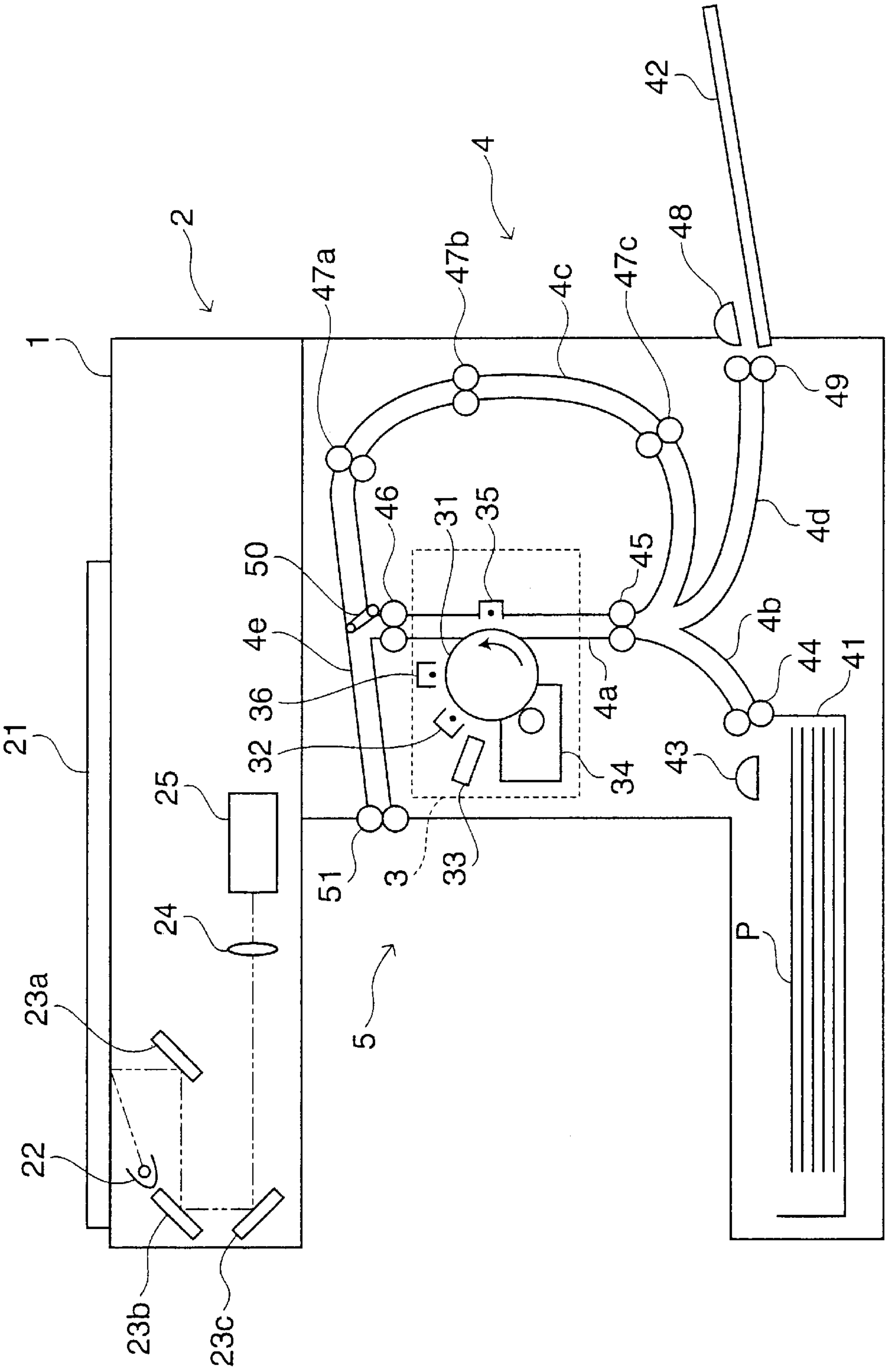
FIG. 1 is a schematic view illustrating the construction of a digital copier which is an image forming apparatus in accordance with an embodiment of the present invention.

In the present invention, the data representative of the blanks on the leading end side or on the tail end side is deleted from the image data for forming images on a plurality of sheets of paper which are transported sequentially. The sheets are transported in such a manner that they partially overlap with one another in the paper transport direction by the length corresponding to the deleted data representative of blanks. Accordingly, the sheets are transported with overlapping by overlap amounts determined on the basis of image ranges in the paper transport direction represented in the image data. The sheets pass through the image forming unit in the shortest time without damage to the images formed on the sheets.

The image forming apparatus of the present invention may further include one or more of the following constructions (1) to (26).

(1) In the above-described construction, the control unit extracts the data representative of the blank from compressed image data.

With this construction, since blanks are represented in an extremely simple form in the compressed image data, the data representative of the blanks can be easily extracted.

(2) The control unit conducts a tail end multiple operation in which the control unit deletes, from the image data, the data representative of the blank on the tail end side of a preceding one of two sequential pages prior to supplying the image forming unit with the image data, and the sheets are transported so that a leading end portion of a following one of two sheets supplied sequentially lies on a tail end portion of a preceding one.

In this construction, the data representative of the blank on the tail end side is deleted from the image data for the preceding sheet and the sheets are transported to the image forming unit in a state such that the leading end portion of the following sheet is laid on the tail end portion of the preceding sheet in the paper transport direction by the length corresponding to the deleted data representative of the blank. The blank corresponds to an area of the preceding sheet on which the following sheet lies, i.e., an area which does not face the image forming unit. By the deletion of the data representative of the blank from the image data, an image is formed on the leading end side of each sheet as the image data represents, while the blank on the tail end side of each sheet is masked by the following sheet. The contents of data representative of the image to be formed on each sheet are not changed.

(3) The control unit conducts a leading end multiple operation in which the control unit deletes, from the image data, the data representative of the blank on the leading end side of a following one of two sequential pages prior to supplying the image forming unit with the image data, and the sheets are transported so that a tail end portion of a preceding one of two sheets supplied sequentially lies on a leading end portion of a following one.

In this construction, the data representative of the blank on the leading end side is deleted from the image data for the following sheet and the sheets are transported to the image forming unit in a state such that the tail end portion of the preceding sheet is laid on the leading end portion of the following sheet in the paper transport direction by the length corresponding to the deleted data representative of the blank. The blank corresponds to an area of the following sheet on which the preceding sheet lies, i.e., an area which does not face the image forming unit. By the deletion of the data representative of the blank from the image data, an image is formed on the tail end side of each sheet as the image data represents, while the blank on the leading end side of each sheet is masked by the preceding paper. The contents of data representative of the image to be formed on each sheet are not changed.

(4) The control unit conducts either the tail end multiple operation or the leading end multiple operation according to a selective operation.

In this construction, the tail end multiple operation or the leading end multiple operation is conducted according to the selective operation of an operator. Thus, the sheets are overlapped with each other in the state selected by the operator according to a desired paper output state, the construction of the paper transport unit or the like, and the fastest image forming operation is performed according to the desired paper output state, the construction of the paper transport unit or the like.

(5) The control unit conducts either the tail end multiple operation or the leading end multiple operation according to a state of the blanks formed in each page.

In this construction, the sheets are overlapped with one another automatically according to the state of the blanks to be formed on the sheets. The fastest image forming operation is conducted according to the image data.

(6) The paper transport unit comprises a paper feed member for feeding the sheets from a paper accommodating section with one sheet overlapping with another and an adjusting member for adjusting an overlap amount of the sheets between the paper accommodating section and the image forming unit, and the control unit operates the adjusting member according to the length in the paper transport direction corresponding to the deleted data representative of the blank.

In this construction, the overlap amount of the sheets fed from the paper accommodating section with overlapping one another by a fixed overlap amount are adjusted according to the lengths corresponding to the deleted data representative of the blanks before the sheets reach the image forming unit. Thus, the sheets fed from the paper accommodating section are guided to the image forming unit in a state such that the sheets are overlapped by the overlap amounts according to the image data.

(7) In the construction of (6), the adjusting member comprises a member for stopping the move of a sheet over a time according to control data supplied by the control unit.

With this construction, the overlap amount is adjusted according to a time during which the adjusting member is actuated on the sheets fed from the paper accommodating section with overlapping one another by a fixed overlap amount. Thus, the overlap amounts of the sheets can be set to proper values by controlling the actuation time of the adjusting member according to the lengths corresponding to the data representative of the blanks deleted from the image data.

(8) In the image forming unit, a separative transport member is provided between a transfer position where an image is transferred onto the sheets and a fixation position where the sheets having passed through the transfer position are heated and pressurized, for separating and transporting the sequentially transported sheets one by one.

In this construction, the sheets passing through the transfer position with overlapping with one another are separately transported to the fixing position. Thus, the sheets are heated and pressurized in a state such that the sheets are separated from each other and consequently do not adhere to each other.

(9) The separative transport member transports each sheet at a paper transport speed faster than that at the transfer position after the tail end of the sheet passes through the transfer position until the leading end of the sheet reaches the fixation position.

In this construction, each sheet is transported faster after its tail end passes through the transfer position until its leading end reaches the fixing position than it is transported at the transfer position. Thus, the preceding sheet which passes through the transfer position with its tail end side overlapping with the following sheet, when its tail end leaves the transfer position, is transported at a higher speed than the speed of the following sheet which is passing through the transfer position, and consequently the preceding sheet is separated from the following sheet.

(10) The separative transport member changes the paper transport speed after the tail end of the sheet passes through the transfer position until the leading end of the sheet reaches the fixation position, according to the length in the paper transport direction corresponding to the deleted data representative of the blank.

In this construction, each sheet is transported faster after its tail end passes through the transfer position until its leading end reaches the fixing position than it is transported at the transfer position, according to the overlap amount with the following sheet. Thus, each sheet is surely separated from the following sheet from its passage through the transfer position to its arrival at the fixing position.

(11) The paper transport unit comprises a paper feed position control member for controlling a vertical position of feeding the sheets from the paper accommodating section according to selection of the tail end multiple operation or the leading end multiple operation.

In this construction, the vertical paper feed position from the paper accommodating section is controlled according to the selection of the tail end multiple operation or the leading end multiple operation. Thus, the sheets are fed downward or upward according to the selected operation, so that a space to which the leading end portion of the following sheet is guided is formed above or below the tail end portion of the preceding sheet.

(12) The paper feed position control member selectively guides the leading end portion of the following sheet from the paper accommodating section above or below the tail end portion of the preceding sheet according to selection of the tail end multiple operation or the leading end multiple operation.

In this construction, the leading end portion of the following sheet is guided above or below the tail end portion of the preceding sheet according to the selection of the tail end multiple operation or the leading end multiple operation. Thus, the tail end portion of the preceding sheet and the leading end portion of the following sheet are overlapped in a state suitable for the selected operation.

(13) The paper feed position control member moves upward or downward the tail end portion of the preceding sheet when the following sheet is fed out of the paper accommodating section, according to selection of the tail end multiple operation or the leading end multiple operation.

In this construction, the tail end portion of the preceding sheet is shifted to an upper position or to a lower position when the following sheet is fed from the paper accommodating section, according to the selection of the tail end multiple operation or the leading end multiple operation. Thus, a space to which the leading end portion of the following sheet is guided is formed above or below the tail end portion of the preceding sheet according to the selected operation, and the preceding sheet and the following sheet are overlapped in a state suitable for the selected operation.

(14) In the construction of (13), the paper feed position control member is a guide member or a fan for moving the tail end portion of the preceding sheet below or above a paper outlet of the paper accommodating section when the following sheet is fed out of the paper accommodating section, according to the selection of the tail end multiple operation or the leading end multiple operation.

With this construction, the tail end portion of the preceding sheet is shifted to an upper position or to a lower position by abutment with the guide member or by air from the fan when the following sheet is fed out of the paper accommodating section, according to the selected operation.

(15) The paper feed position control member moves upward or downward the leading end portion of the following sheet when the following sheet is fed out of the paper accommodating section according to selection of the tail end multiple operation or the leading end multiple operation.

In this construction, the leading end portion of the following sheet fed from the paper accommodating section is shifted to an upper position or to a lower position according to the selection of the tail end multiple operation or the leading end multiple operation. Thus, the leading end portion of the following sheet is surely guided above or below the tail end portion of the preceding sheet according to the selected operation.

(16) In the construction of (15), the paper feed position control member is a lever or a friction roller for moving the leading end portion of the following sheet below or above a paper outlet of the paper accommodating section when the following sheet is fed out of the paper accommodating section, according to the selection of the tail end multiple operation or the leading end multiple operation.

With this construction, the leading end portion of the following sheet fed out of the paper accommodating section is shifted to an upper position or to a lower position by abutment with the lever or by rotation of the friction roller, according to the selection of the tail end multiple operation or the leading end multiple operation. Thus, the leading end portion of the following sheet is surely guided above or below the tail end of the preceding sheet according to the selected operation.

(17) The paper transport unit forms at least two separate transport routes separate to each other between the paper accommodating section and the image forming unit, a separation claw is provided between the separate transport routes and the paper accommodation section for guiding the sheets alternately to the separate transport routes, and an overlap member is provided between the separate transport routes and the image forming unit for guiding the leading end of a sheet passing through one separate transport route above or below the tail end of a sheet passing through another separate transport route according to selection of the tail end multiple operation or the leading end multiple operation.

In this construction, the sheets continuously fed from the paper accommodating section are guided sequentially to the separate transport routes, transported via the separate transport routes and then overlapped before the image forming unit according to the selection of the tail end multiple operation or the leading end multiple operation. Thus, the sheets are transported to the image forming unit with overlapping suitably for the selected operation.

(18) In the construction of (17), the separation claw and the overlap member form claws and members, respectively, which are separately disposed in a plurality of positions in the direction orthogonal to the paper transport direction.

With this construction, the separation claws and the overlap members can be brought in abutment on suitable positions of a transported sheet according to the size of the sheet. Consequently, the sheets can be accurately guided from the paper accommodating section to the separate transport routes, and also can be accurately moved so that sequential sheets overlap with one another.

(19) In the construction of (17), the separation claw may form a plurality of paper abutting faces having the same curvatures as those of transport faces of the separate transport routes.

With this construction, the sheets fed from the paper accommodating section can be guided to the separate transport routes smoothly.

(20) The overlap member pushes down the tail end portion of the preceding sheet transported via one separate transport route below the leading end portion of the following sheet transported via another separate transport route in the case where the tail end multiple operation is selected, and pushes up the tail end portion of the preceding sheet transported via one separate transport route above the leading end portion of the following sheet transported via another separate transport route in the case where the leading end multiple operation is selected.

In this construction, the overlap member disposed between the separate transport routes and the image forming unit moves the tail end portion of the preceding sheet below or above the leading end portion of the following sheet, according to the selection of the tail end multiple operation or the leading end multiple operation. Thus, sequential sheets transported via the separate transport routes are guided to the image forming unit with overlapping suitably for the selected operation.

(21) The paper transport unit comprises a transport route formed with at least one curve having a predetermined curvature between the paper accommodation section and the image forming unit and provided with paper transport rollers on a paper accommodating section side and on an image forming section side of the transport route and a paper sensor disposed at the center of the curve of the transport route, and the control unit controls drive and stop of the transport rollers so that the tail end of the preceding sheet fed out of the paper accommodating section previously is stopped near the curve of the transport route and the leading end portion of the following sheet fed out of the paper accommodating section next is guided above or below the tail end portion of the preceding sheet.

With this construction, the leading end portion of the following sheet can be overlapped with the tail end portion of the preceding sheet by holding the tail end portion of the preceding sheet near the curve of the transport route and utilizing the elasticity of the sheets near the curve.

(22) In the construction of (21), the control unit controls the drive and stop of the transport rollers so as to change the position of holding the tail end portion of the preceding sheet near the curve according to the selection of the tail end multiple operation or the leading end multiple operation.

With this construction, by changing the position of holding the tail end portion of the preceding sheet near the curve and utilizing the elasticity of the sheets near the curve, it is possible to hold the tail end portion of the preceding sheet in contact with an upper side of the curve and position the tail end portion of the preceding sheet below the leading end portion of the following sheet, or alternately it is possible to hold the tail end portion of the preceding sheet in contact with a lower side of the curve and position the leading end portion of the following sheet above the tail end portion of the preceding sheet.

(23) In the construction of (21), the control unit varies a rotational speed of the transport roller on the paper accommodation section side according to a state of the blank on each page and a result detected by the paper sensor.

With this construction, it is possible to shorten the time for overlapping the tail end portion of the preceding sheet with the leading end portion of the following sheet and improve the accuracy in an overlap position.

(24) In the construction of (21), the control unit rotates the transport roller on the paper accommodating section side reversibly according to the state of the blank on each page and a result detected by the paper sensor.

With this construction, it is possible to adjust the position of overlapping the tail end portion of the preceding sheet with the leading end portion of the preceding sheet.

(25) The image forming apparatus may further comprise a communication section for sending and receiving image data, positional data thereof and copying conditions thereof to and from an external terminal via a network.

With this construction, the image data received via the network, like image data read from an original document, can be output on sheets of paper by transporting the sheets fed from the paper accommodating section with overlapping the tail end portion of the preceding sheet with the leading end portion of the following sheet.

The present invention is now described in further detail by way of examples with reference to the attached drawings which should not be construed to limit the scope of the invention.

FIG. 1 shows a general construction of a digital copier which is an image forming apparatus in accordance with an embodiment of the present invention. A digital copier 1 includes an image reading unit 2, an image forming unit 3 and a paper transport unit 4. The image forming unit 3 is composed of a document table 21 of transparent glass on its top, and an exposure lamp 22, mirrors 23*a* to 23*c*, a lens 24 and a photoelectric conversion device (referred to as a reading sensor hereinafter) 25 which are disposed under the document table 21. The exposure lamp 22, together with the mirror 23*a*, moves laterally reciprocally under the document table 21 and exposes the entire image face of a document placed on the document table 21 to light. The mirrors 23*b* and 23cmoves laterally reciprocally under the document table 21 at half the speed of the exposure lamp 22 and the mirror 23*a*. The mirrors 23*a* to 23cdirect light emitted from the exposure lamp 22 and reflected by the image face of the document toward the lens 24. The lens 24 focuses the light reflected by the image face of the document on a light-receptive face of the reading sensor 25. The reading sensor 25 outputs an electric signal corresponding to the amount of light received through the light-receptive face as a read signal.

Figure 28:
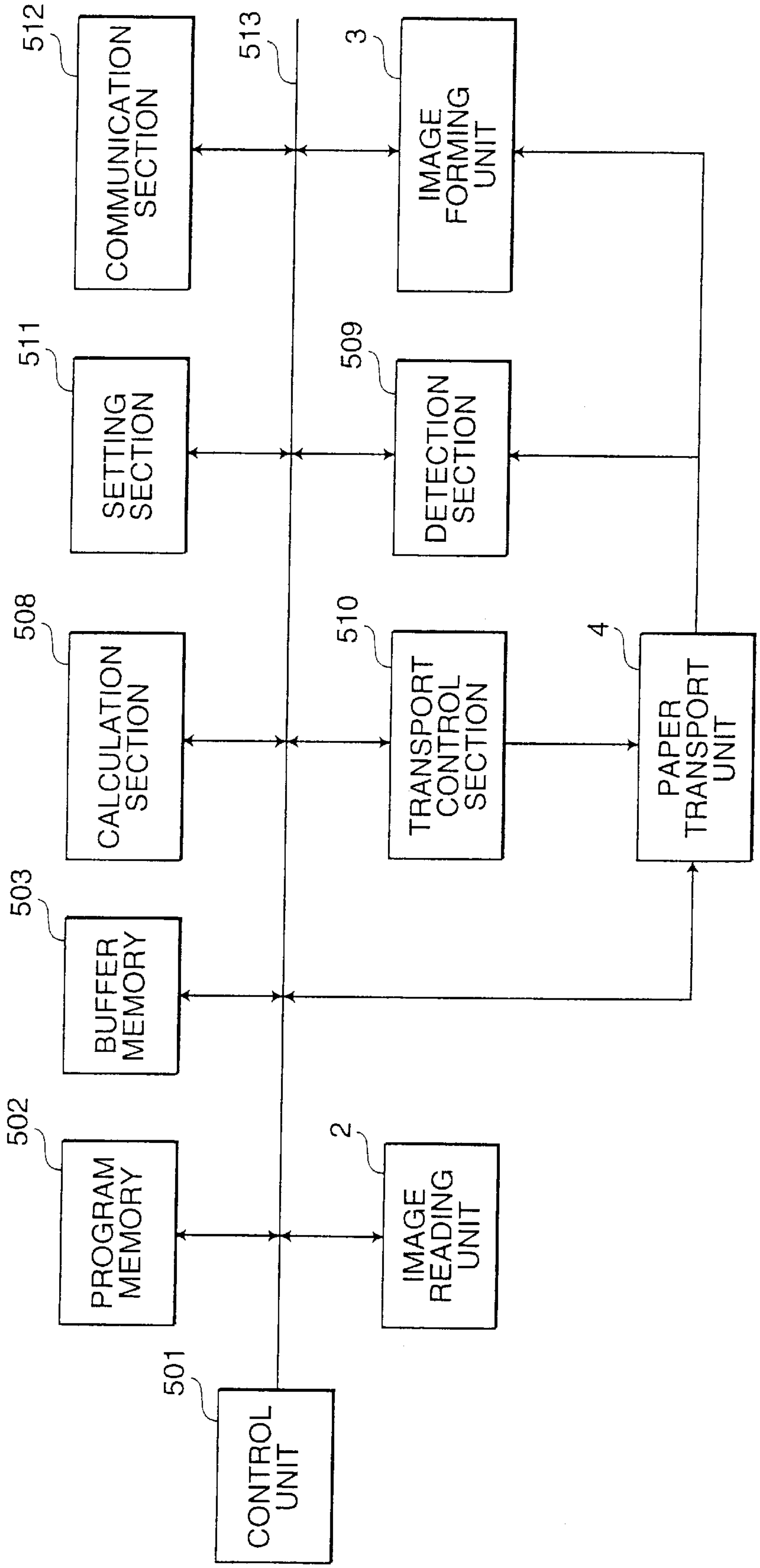
FIG. 28 is a diagram generally illustrating relationship of a control system of the copier shown in FIG. 1.

FIG. 28 is a diagram generally illustrating a control system of the copier 1 shown in FIG. 1. In FIG. 28, a control unit 501 controls a plurality of components including the image reading unit 2, the image forming unit 3, the paper transport unit 4 and the like. The control unit 501 may be composed of a CPU, for example.

A program memory 502 stores a control program for the control units 501 to control the components, and may be composed of a ROM, an EEPROM, a floppy disk, a hard disk, an MO and the like, for example.

A buffer memory 503 stores image data, copying conditions, data concerning a currently conducted control and the like, and may be composed of a ROM, an EEPROM, a floppy disk, a hard disk, an MO and the like, for example. The image data read by the image reading unit 2 is stored in the buffer memory 503.

A calculation section 508 calculates a blank in the leading end portion and in the tail end portion of the sheet beforehand according to the image data and positional data thereof, and may be composed of a CPU and the like, for example.

A detection section 509 detects the leading end portion and the tail end portion of the sheet which is being transported, and may include various kinds of sensors as described later.

A transport control section 510 controls the driving and stopping of the transport rollers, and may be composed of a transport control program, a CPU and the like, for example.

A setting section 511 is for setting copying conditions including the leading end multiple operation and the tail end multiple operation, and may be composed of a button switch, a tough panel formed on a liquid crystal display and the like, for example.

A communication section 512 receives and sends image data, positional data thereof and copying conditions thereof from and to an external terminal via a network, and may be formed of a modem, a communication control circuit and the like, for example.

A bus 513 transfers various kinds of data such as address data, control data, image data and the like when the control unit 501 controls the components.

As shown in FIG. 1, the image reading unit 2 is provided with an image processor, which binarizes the read signal output by the reading sensor 25 to convert it into an image data and supplies the image data to the image forming unit 3.

The image forming unit 3 is composed of a photoconductive drum 31 formed with a photoconductive layer on its surface, and an electric charger 32, a scan unit 33, a developing section 34, a transfer device 35, a charge remover 36 and the like which are disposed around the photoconductive drum 31. The photoconductive drum 31 rotates at a constant speed in a direction indicated by an arrow in the figure. The electric charger 32 provides an electric charge of a single polarity uniformly on the surface of the photoconductive drum 31. The scan unit 33 irradiates the surface of the photoconductive drum 31 with an image light modulated by the image data supplied by the image processor. Thereby, an electrostatic latent image is formed on the surface of the photoconductive drum 31 by photoconductive action. The developing section 34 supplies a developer to the surface of the photoconductive drum 31 and visualizes the electrostatic latent image into an image of the developer. A transfer position of the present invention is defined between the transfer section 35 and the photoconductive drum 31 where the image of the developer is transferred onto the surface of a sheet of paper. The charge remover 36 removes the electric charge remaining on the surface of the photoconductive drum 31 having been through a transfer process.

The paper transport unit 4 forms a main transport route 4*a*, a paper feed route 4*b*, sub-transport route 4*c*, a manual paper feed route 4*d* and a paper output route 4*e* from a paper feed cassette 41 disposed at a bottommost portion of the digital copier 1 and a manual paper feed tray 42 mounted on one side face of the digital copier 1 to a paper output unit 5 vie the image forming unit 3. The paper feed cassette 41 accommodates a plurality of sheets of paper P of the same size. The main transport route 4*a* is provided with resist rollers 45 and fixation roller 46 and connects the paper feed route 4*b* and the manual paper feed route 4*d* with the paper output route 4*e* via the transfer position within the image forming unit 3. The paper feed route 4*b* is provided with a pick-up roller 43 and paper feed rollers 44 and connects the paper feed cassette 41 with the main transport route 4*a*. The sub-transport route 4*d* is provided with transport rollers 47*a* to 47*c* and connects the paper output route 4*e* and the resist rollers 45. The sub-transport route 4*d* is used, in a double-sided copy mode, for reversing a sheet of paper having an copied image on one face upside down and guiding the sheet to the image forming unit 3 again. The manual paper feed route 4*d* is provided with a pick-up roller 48 and paper feed rollers 49 and connects the manual paper feed tray 42 with the main transport route 4*e*. The paper output route 4*e* is provided with a flapper 50 and paper output rollers 51 and connects the main transport route 4*a* with the paper output unit 5.

The paper feed cassette 41 and the manual paper feed tray 42 are each provided with a paper release member (not shown) at their front end in the paper feeding direction. The paper release member, for example, is composed of a friction sheet or a counterrotating roller disposed opposedly to the pick-up roller 43 or 48.

The resist rollers 45 apply a transporting force selectively to a sheet of paper fed from the paper feed cassette 41 or the manual paper feed tray 42. More particularly, the resist rollers 45 stop the fed sheet prior to the rotation of the photoconductive drum 31 and then guide the sheet to the transfer position at timing synchronized with the rotation of the photoconductive drum 31. Thus, the leading end of the sheet agrees with the leading end of the image of the developer carried on the photoconductive drum 31, at the transfer position.

The fixation roller 46 defines a fixing position in the present invention and fix the image of the developer firmly on the surface of the sheet by heating and pressurizing the sheet having finished the transfer process. A fixation detecting switch S2 is disposed on a downstream side of the fixation roller 46 in the main transport route 4*a*. The fixation detecting switch S2 detects the passage of the sheet through the fixation roller 46 and outputs a predetermined detection signal. The peripheral speed of the fixation roller 46 is set higher than that of the photoconductive drum 31. Accordingly, the paper transport speed at the fixing position is faster than that at the transfer position.

Further, the flapper 50 determines a paper transport direction cooperatively with the paper output rollers 51 in the double-sided copy mode. More particularly, in the double-sided copy mode, when an image has been formed on a first face of a sheet of paper, the paper output rollers 51 once rotate in the direction of outputting the sheet and then rotate reversely with sandwiching the sheet in order to reverse the transport direction for the sheet having the copied image on its first face. At this time, the sub-transport route 4*c* is opened, so that the sheet having the copied image on its first face is guided to the sub-transport rote 4*c* and transported into the main transport route 4*a* to pass the transfer position with its faces reversed. When an image has been formed on the second face of the sheet in the double-sided copy mode, the flapper 50 opens a path between the main transport route 4*a* and the paper output route 4*e*, so that the sheet having the copied images on both the faces thereof is outputted to the paper output unit 5 by the paper output rollers 51.

Figure 2C:
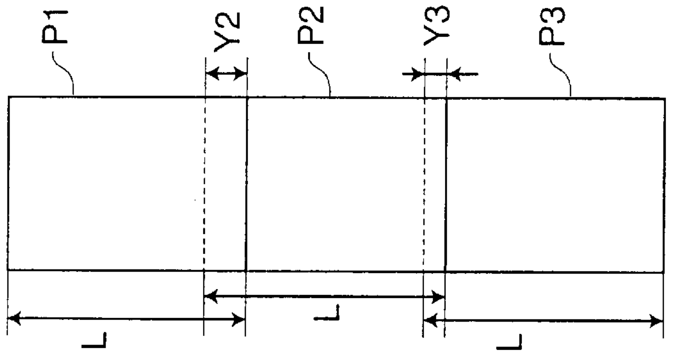
FIGS. 2(A) to 2(C) illustrate paper transporting states in the digital copier.
Figure 2B:
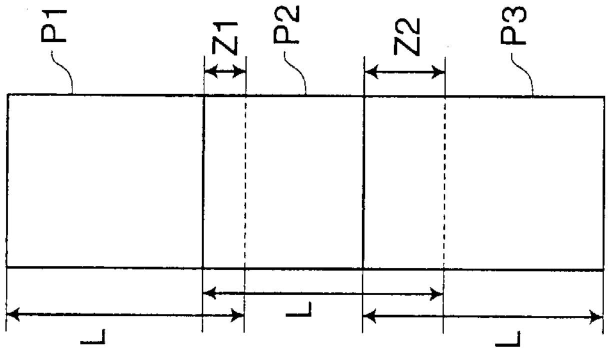
Figure 2A:
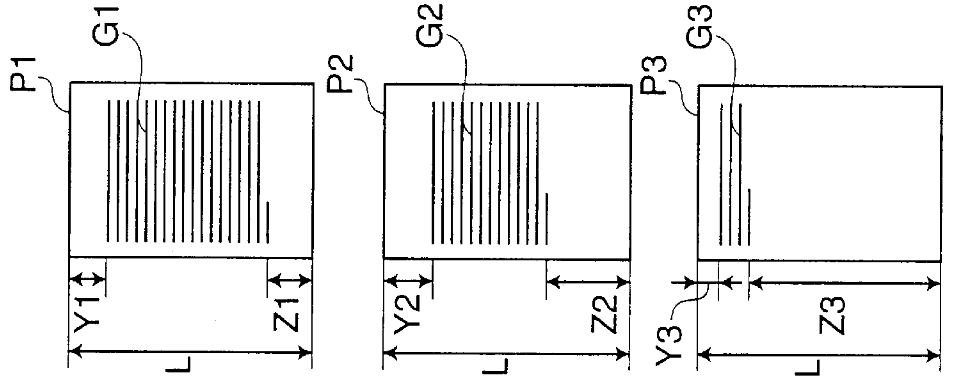

FIGS. 2(A) to 2(C) illustrates paper transporting states in the above-described digital copier. In a continuous copy mode on a plurality of sheets of paper in the digital copier 1, the sheets are transported to the image forming unit 3 in a state such that they are overlapped with each other depending upon the extent of blanks to be formed on the leading end side or on the tail end side of the sheets in the paper transport direction according to image data to be formed on the sheets.

For example, as shown in FIG. 2(A), if images G1 to G3 having leading end blanks Y1 to Y3 and tail end blanks Z1 to Z3 are to be formed on three sheets of paper P1 to P3 having a length L in the transport direction, respectively, the distance from the leading end of a first sheet P1 to the tail end of a third sheet P3 is 3L−(Z1+Z2) in the tail end multiple operation (see FIG. 2(B)), and 3L−(Y2+Y3) in the leading end multiple operation (see FIG. 2(C)). In the tail end multiple operation, as shown in FIG. 2(B)), a plurality of sheets of paper are transported in a state such that the leading end portion of a following sheet, which is fed behind from the paper feed cassette or tray, is laid on the tail end portion of a preceding sheet, which is fed ahead from the paper feed cassette or tray. In the leading end multiple operation, as shown in FIG. 2(C), a plurality of sheets of paper are transported in a state such that the tail end portion of a preceding sheet is laid on the leading end portion of a following sheet of paper. Accordingly, the larger blanks the image data to be formed on the sheets have, the more the sheets overlaps each other and the more the image formation time is reduced because all the sheets pass through the transfer position in a shorter time.

Now explanation is given of the leading end multiple operation, as an example, in which a plurality of sheets of paper are transported in the state in which the tail end portion of the preceding sheet lies on the leading end portion of the following sheet.

Figure 3:
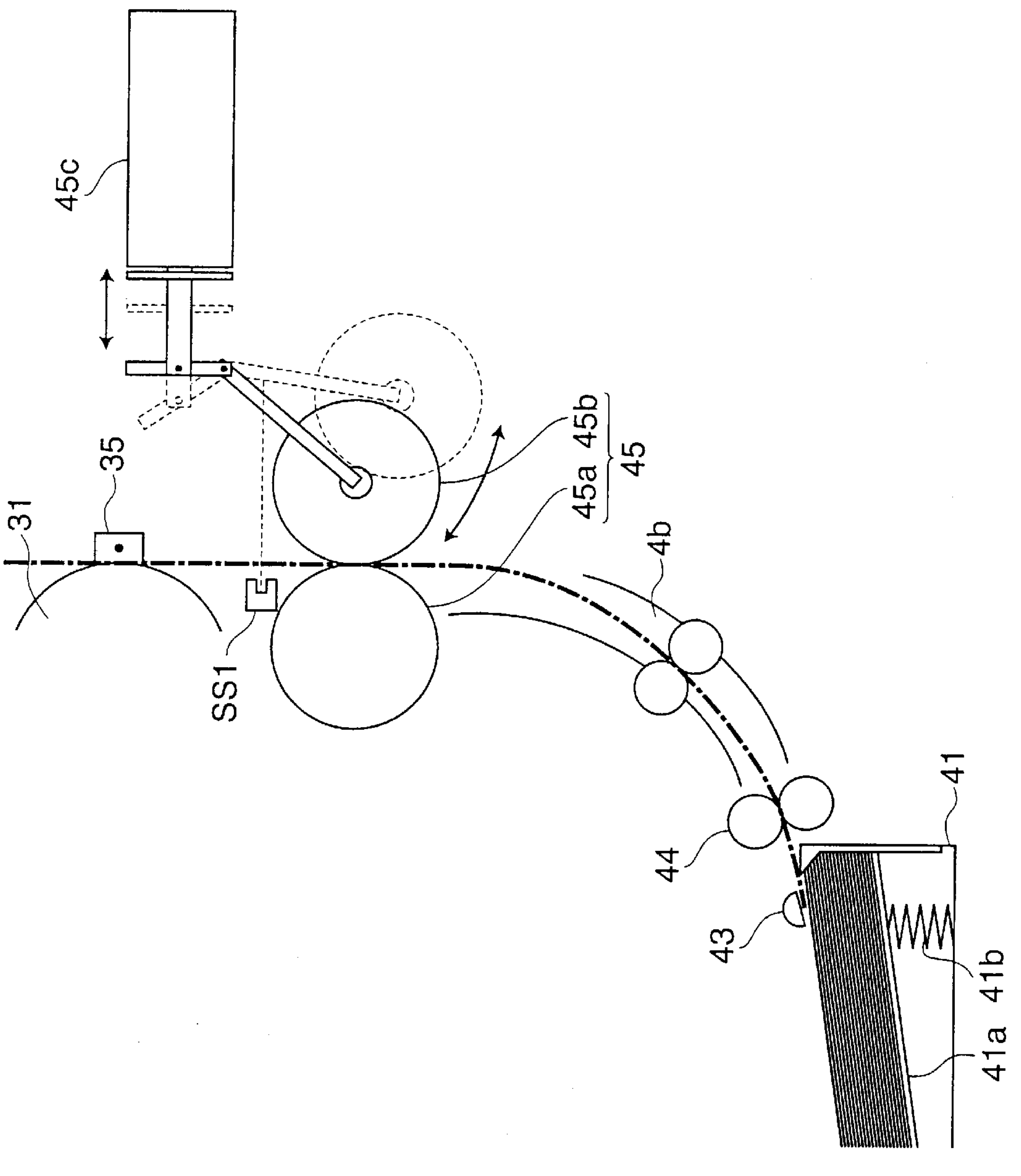
FIG. 3 is a schematic view illustrating a construction around a paper feed route of a paper transport unit in the digital copier.

FIG. 3 shows a construction around the paper feed route of the paper transport unit in the above-descried digital copier. In the digital copier 1, the pick-up roller 43 and the paper feed rollers 44 of the paper feed route 4*b* and the resist rollers 45 are disposed in the paper feed cassette 41 of the paper transport unit 4 and at the transfer position (a position where the photoconductive drum 1 is opposed to the transfer device 35) of the image forming unit 3. The pick-up roller 43 and the paper feed rollers 44 correspond to the paper feed members of the present invention, and the resist rollers 45 correspond to the adjusting members of the present invention.

Here, the paper feed cassette 41 includes a supporting plate 41*a* and a spring 41*b* urging upward the supporting plate 41*a* together with the sheets of paper P thereon. The pick-up roller 43 has a cross section of a partial arc shape with a partial cut circumference and is pivoted at a position opposed to the vicinity of the leading end portion of the topmost face of the sheets P placed on the supporting plate 41*a* in the paper feed cassette 41 in a state such that a cut portion is opposed to the topmost face of the sheets placed on the supporting plate 41*a* when it stands still.

With this construction, when the pick-up roller 43 rotates, an arc portion of the pick-up roller 43 enters the paper feed cassette 41 and the sheets P in the paper feed cassette 41 are pushed down together with the supporting plate 41*a*. Thereby, the sheet positioned at the top is brought in pressure contact with the arc portion of a circumferential surface of the pick-up roller 43 by a springy force of the spring 41*b* and is sent out toward the paper feed rollers 44 as the pick-up roller 43 rotates. At this time, the sheet on the top is separated from the second top sheet by the above-mentioned paper release member. Thus one sheet is sent out of the paper feed cassette 41 every time the pick-up roller 43 rotates once.

In this construction, if the pick-up roller 43 is rotated while part of the sheet on the top sent out of the paper feed cassette 41 still remains within the paper feed cassette 41, the arc portion of the pick-up roller 43, abutting the top sheet at a part backward from the midpoint on its upper face, pushes down the sheets P together with the supporting plate 41*a*. Thereby the part backward from the midpoint on the upper face of the top sheet is brought in pressure contact with the arc portion of the peripheral surface of the pick-up roller 43 by the springy force of the spring 41*b*. Then, as the pick-up roller 43 rotates, the second sheet from the top is also sent out to the paper feed rollers 44 by friction with a lower face of the top sheet. At this time, the second sheet is separated from the third sheet by the paper release member.

Thus, a plurality of sheets of paper can be sent out with overlapping each other by rotating the pick-up roller 43 a plurality of times while preceding sheets sent out of the paper feed cassette 41 still remain partially within the paper feed cassette 41. At this time, the tail end portion of a preceding sheet lies on the leading end portion of the following sheet. The overlap amount of the sheets varies depending upon the intervals of rotations of the pick-up roller 43.

On the other hand, the resist rollers 45 are composed of a drive roller 45*a* and a follower roller 45*b*. The drive roller 45*a* is supplied with a rotating force via a transmission mechanism not shown and transports a sheet of paper sandwiched between the drive roller 45*a* and the follower roller 45*b* to the transfer position where the photoconductive drum 31 and the transfer device 35 are opposed to each other. The follower roller 45*b* moves to a spaced position where the follower roller 45*c* is spaced from the drive roller 45*a* or a contacted position where the follower roller 45*c* is contacted with the drive roller 45*a* according to an on/off state of a solenoid 45*c*. When the solenoid 45*c* is on, the follower roller 45*b* moves to the spaced position so that the transport of the sheet stops. When the solenoid 45*c* is off, the follower roller 45*c* moves to the contacted position so that the sheet is transported.

Also a first paper sensor SS1 is disposed between the resist rollers 45 and the photoconductive drum 31 in the main transport route 4*a*. The first paper sensor SS1 detects the passage of the leading end portion of each sheet of paper through the resist rollers 45. The first paper sensor SS1 detects the passage of the leading end portion of each sheet through the resist rollers 45 also in the multiple operation in which a plurality of sheets of paper are transported with overlapping each other.

For example, in the case where an optical sensor of reflection type or a mechanical sensor is used as the first paper sensor SS1, a curved portion is formed in the main transport route 4*a* at a position upstream in the transport direction from a site where the first paper sensor SS1 is placed. Thereby, the leading end portion of the following one of two overlapping sheets of paper is separated from the tail end portion of the preceding sheet when it passes the position of the first paper sensor SS1, and a value detected by the first paper sensor SS1 varies greatly. The leading end portion of the following sheet can be detected by this great variation. Therefore, in the construction shown in FIG. 3, the first paper sensor SS1 formed of an optical sensor of reflection type or a mechanical sensor should be placed on a follower roller 45*b* side at the leading end multiple operation in which the tail end portion of the preceding sheet is laid on the leading end portion of the following sheet and should be placed on a drive roller 45*a* side at the tail end multiple operation in which the leading end portion of the following sheet is laid on the tail end portion of the preceding sheet.

On the other hand, in the case where an optical sensor of transmission type is used as the first paper sensor SS1, a light source and a light-receptive element is disposed in an opposing relation to sandwich a sheet of paper which is being transported. The passage of the tail end portion of the following sheet through the resist rollers 45 is detected from a decrease in the amount of light from the light source to the light-receptive element via sheets of paper.

Figure 4:
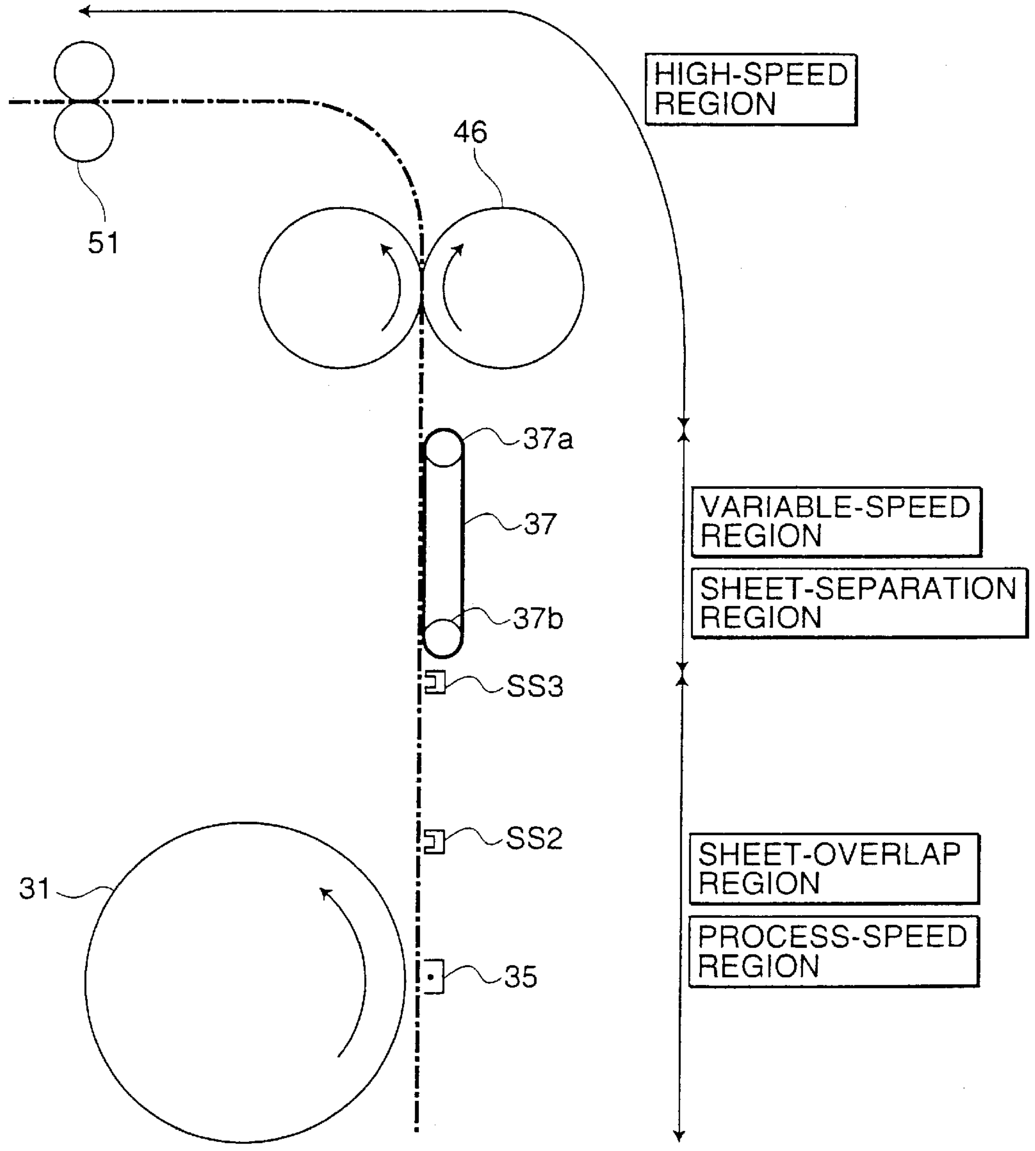
FIG. 4 is a schematic view illustrating a construction around a main transport route of the paper transport unit in the digital copier.

FIG. 4 shows the construction around the main transport route of the paper transport unit in the above-described digital copier. In the paper transport unit 4 of the digital copier 1, a second paper sensor SS2, a third paper sensor SS3 and a variable-speed belt 37 are disposed between the photoconductive drum 31 and the fixation roller 46 in the image forming unit 3. The second paper sensor SS2 detects if the tail end of a sheet of paper passes through the transfer position where the photoconductive drum 31 is opposed to the transfer device 35. The third paper sensor SS3 detects the arrival of the tail end of the sheet at an upstream side of the variable-speed belt 37 and the arrival of the leading end of the sheet at the fixation roller 46. Similarly to the above-mentioned first paper sensor SS1, an optical sensor of reflection or transmission type or a mechanical sensor may be used as the second paper sensor SS2 and the third paper sensor SS3. The variable-speed belt 37 may be an endless belt entrained with tension at a pair of pulleys 37*a* and 37*b* and corresponds to the separative transport member of the present invention.

The photoconductive drum 31 rotates at a specific rotation speed equal to the speed of an image forming process (process speed) including a charging process, an exposing process, a developing process and a transfer process. On the other hand, the fixation roller 46 rotates at a higher speed than the peripheral speed of the photoconductive drum 31. The variable-speed belt 37 disposed between the photoconductive drum 31 and the fixation roller 46 rotates at the same peripheral speed as that of the photoconductive drum 31 when the image of the developer is being transferred onto a sheet of paper at the transfer position, and the variable-speed belt 37 rotates at the same peripheral speed as that of the fixation roller 46 after the tail end of the sheet which contacts the periphery of the variable-speed belt 37 passes the position of the second paper sensor SS2 (after the transfer step on the sheet is completed) until its tail end passes the position of the third paper sensor SS3 (until its leading end reaches the fixation roller 46). That is, the variable-speed belt 37 rotates at the peripheral speed of the photoconductive drum 31 or at the peripheral speed of the fixation roller 46 depending upon a transport state of the sheet.

Accordingly, a region from the paper feed cassette 41 to the third paper sensor SS3 in the paper transport route is a process speed region where the sheet is transported at the process speed and also a sheet overlap region where sheets of paper overlap each other. A region in the paper transport route where the variable-speed belt 37 is disposed is a variable-speed region where the paper transport speed varies and also a sheet separation region where the overlapping state of the sheets is released. Further, a region from a downstream side of the variable-speed belt 37 to the paper output rollers 51 in the paper transport route is a high-speed region where the sheet is transported at a speed higher than the process speed.

Figure 5:
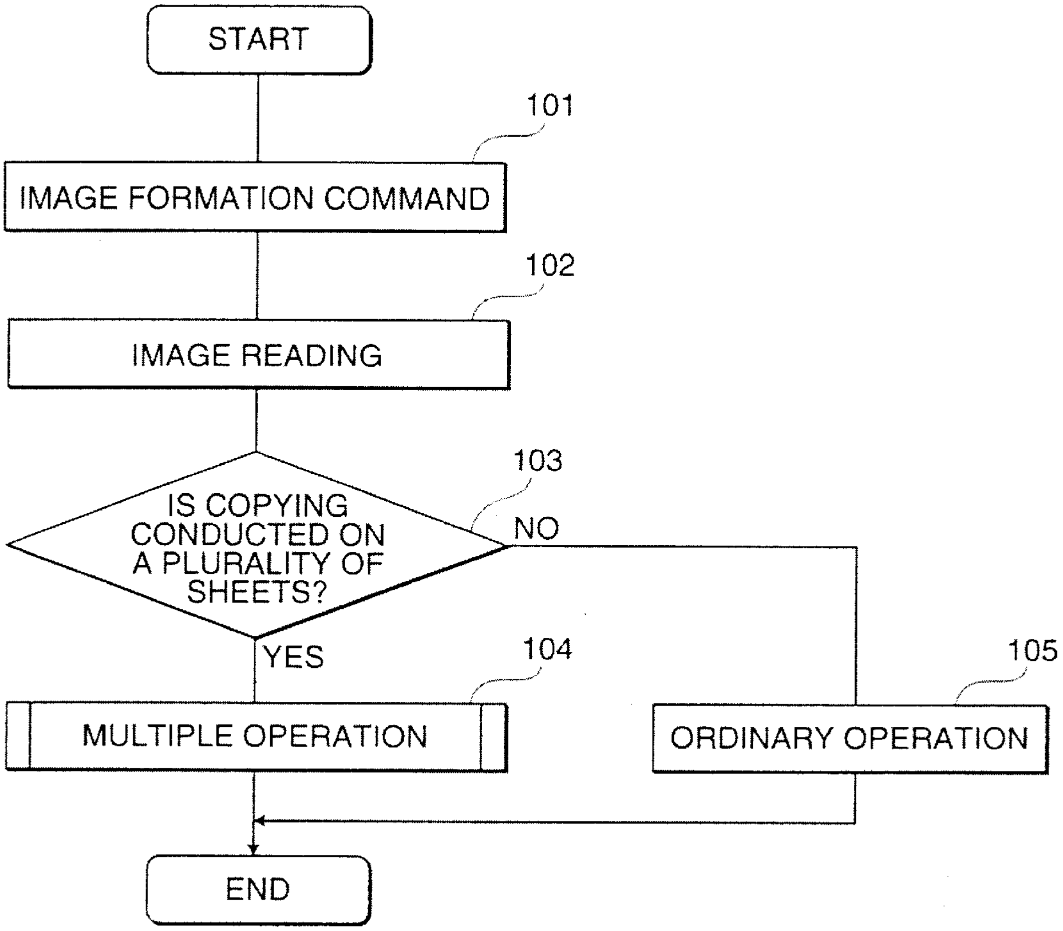
FIG. 5 is a flow chart illustrating a part of operational steps in a control unit of the digital copier.

FIG. 5 is a flow chart illustrating a part of operational steps in the control unit of the above-described digital copier. A document is placed on the document table 21, and copy settings including the number of copies to be made, the paper size to be used and the like are input. Thereafter, when an image formation command is input (step 101) by actuation of a start button or the like, the control unit of the digital copier 1 operates the image reading unit 2 to read an image of the document on the document table 21 and form image data for one page (step 102). Then, according to the input copy settings, the control unit judges whether image formation is to be performed on a plurality of sheets of paper in this copying operation (step 103). If the image formation is to be performed on a plurality of sheets of paper, the multiple operation is carried out (step 104). If the image formation is to be made on a single sheet of paper, an ordinary operation is carried out (step 105).

Figure 6:
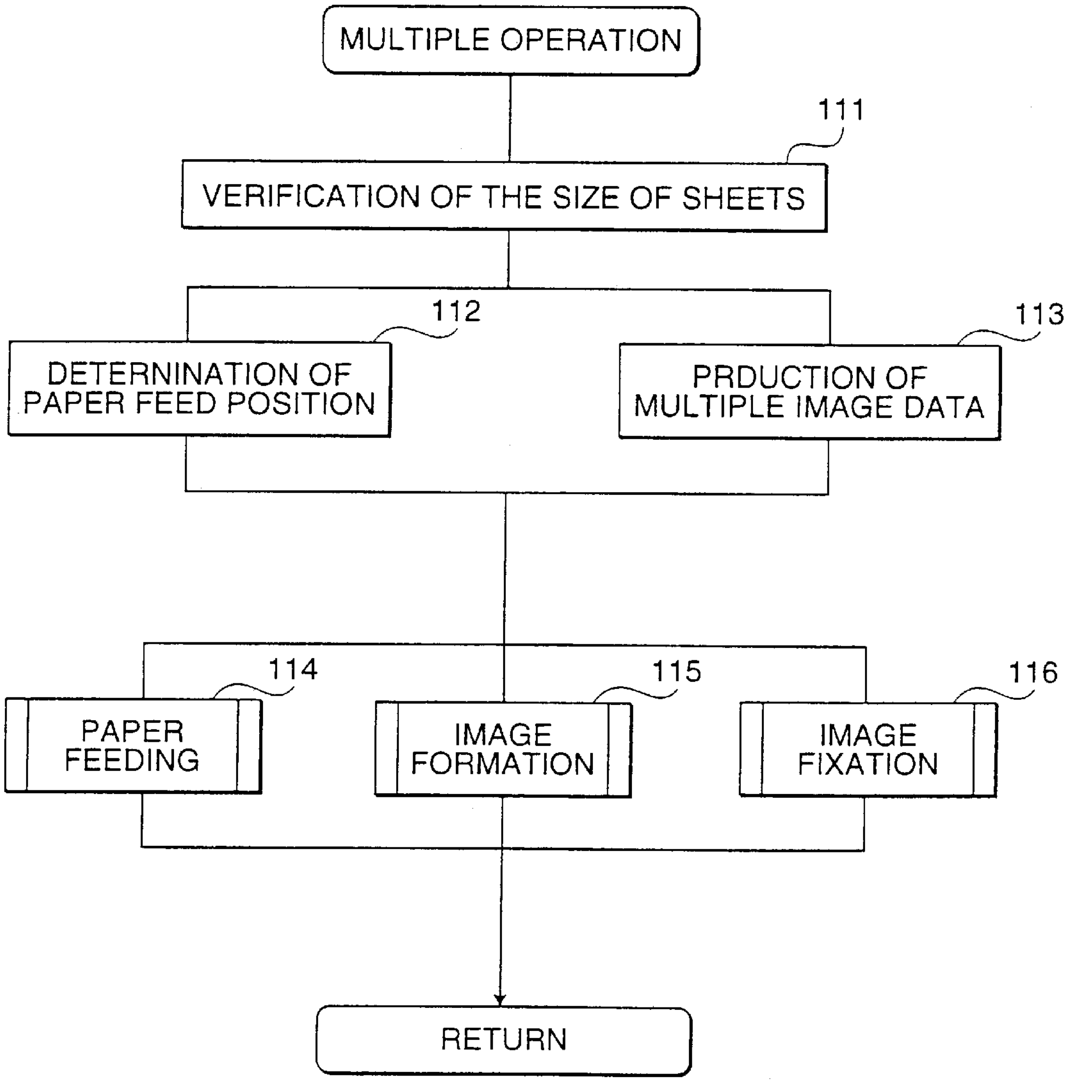
FIG. 6 is a flow chart illustrating operational steps at a multiple operation in a control unit of digital copier.

FIG. 6 is a flow chart illustrating operational steps at the multiple operation in the control unit of the above-described digital copier. In the multiple operation in which the image formation is performed on a plurality of sheets of paper transported in the overlapping state, the control unit first verifies the paper size from the input copy settings (step 111) and determines a paper feed position according to the set paper size (step 112). This determination of the paper feed position is to determine which of the paper feed cassette 41 or the manual paper feed tray 42 the sheets of paper are to be fed from, for example. At the same time, the control unit performs some image processing on the image data and then produces multiple image data (step 113). Thereafter, the control unit carries out a paper feed operation to feed a plurality of sheets of paper continuously from the determined paper feed position (step 114), an image formation operation based on the produced multiple image data (step 115) and an image fixation operation (step 116) simultaneously.

Figure 7:
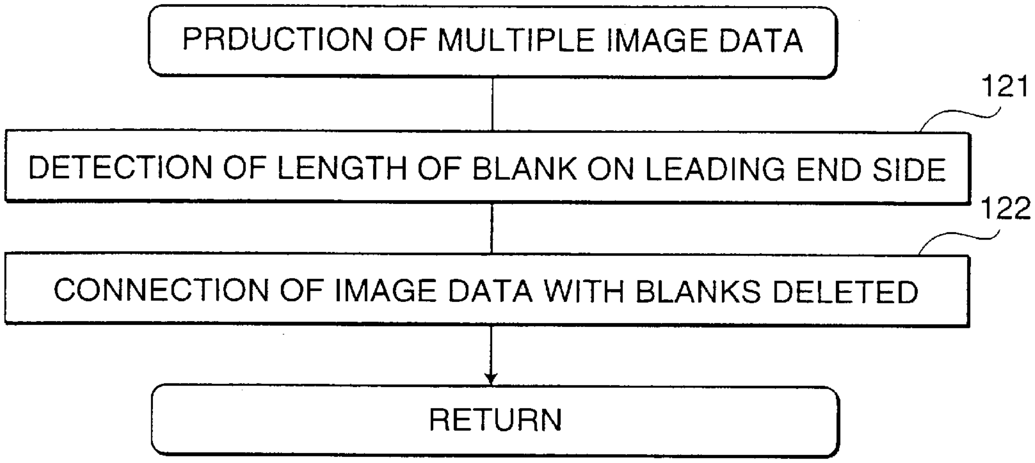
FIG. 7 is a flow chart illustrating operational steps of multiple image data formation included in the multiple operation in the control unit.

FIG. 7 is a flow chart illustrating operational steps of multiple image data formation included in the multiple operation in the control unit. In the case where the leading end multiple operation in which the image formation is performed with the tail end portion of the following sheet being overlapped on the leading end portion of the following sheet, the control unit detects the length of a blank at the leading end portion in the paper transport direction with regard to image data for each of the second and onward pages of a plurality of pages whose images are to be formed continuously, and temporarily stores detection results in a memory (step 121). Subsequently, the control unit produces a single piece of multiple image data by deleting data corresponding to the length of the blank stored in the memory from the image data for the second and onward pages and then sequentially connecting the image data for all the pages (step 122).

Concerning the detection of the length of the blank at the leading end, the image data for each page is compressed by the image processing section of the image reading unit 2 or by the control unit and the data representing the blank has a simple form of continuous "0"s. Thereby, the data of the blank can be easily extracted from the image data.

For example, supposing that the leading end multiple operation is carried out on the image data for two pages, if the image data for the first page is 0000000BDCF13D8C . . . 12430B1237000000 and the image data for the second page is 00000000000CB0FF . . . 890231ABCD090000, the data corresponding to a blank at the leading end of the second page is deleted and then the image data for the second page is connected to the image data for the first page to form multiple image data of 0000000BDCF13D8C . . . 12430B1237000000CB0FF . . . 890231ABCD090000.

Alternately, all data corresponding to blanks at the leading and trailing ends of a plurality of pages whose images are to be continuously formed may be deleted from the image data for the pages, and new line codes may be added for a necessary blank area to the image data for each page at image formation.

Figure 8:
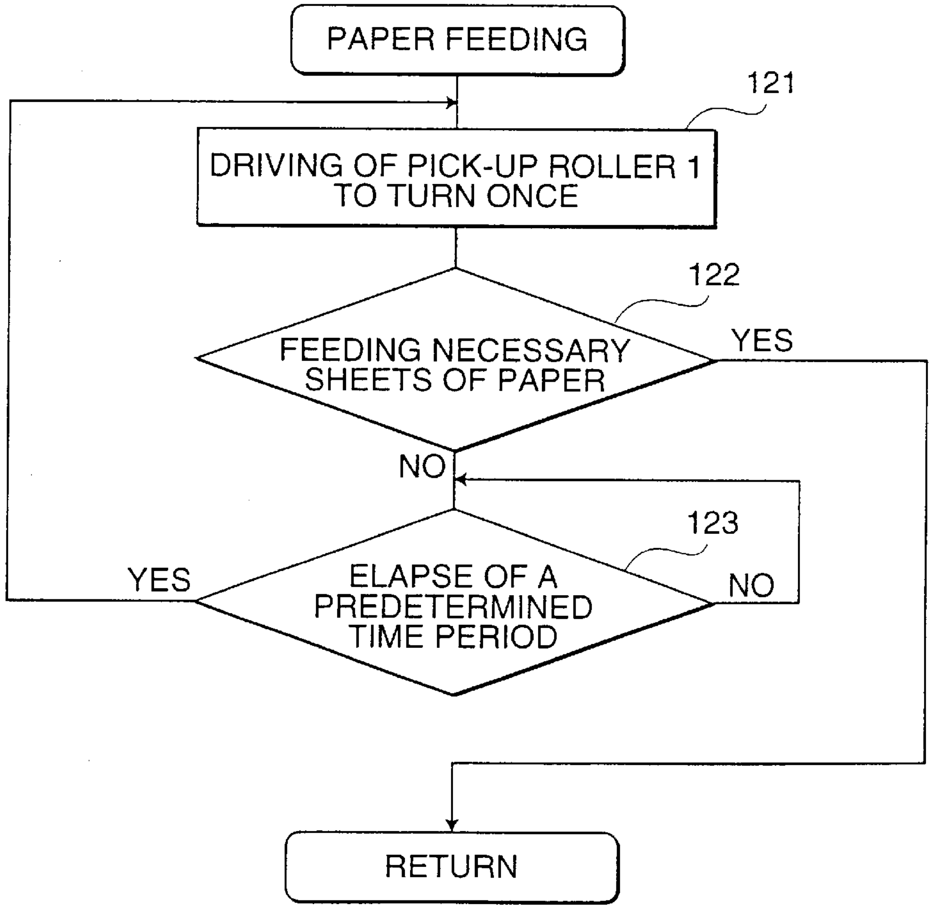
FIG. 8 is a flow chart illustrating operational steps of paper feed included in the multiple operation in the control unit.

FIG. 8 is a flow chart illustrating operational steps of paper feed included in the multiple operation in the control unit. The control unit repeats the rotation of the pick-up roller 43 at predetermined intervals for the number of sheets of paper calculated in step 103 (step 121 to 123). Thereby, the number of sheets required by the commanded copy operation are sent out to the paper feed route 4*b* with overlapping with each other by given overlap amounts.

Figure 9:
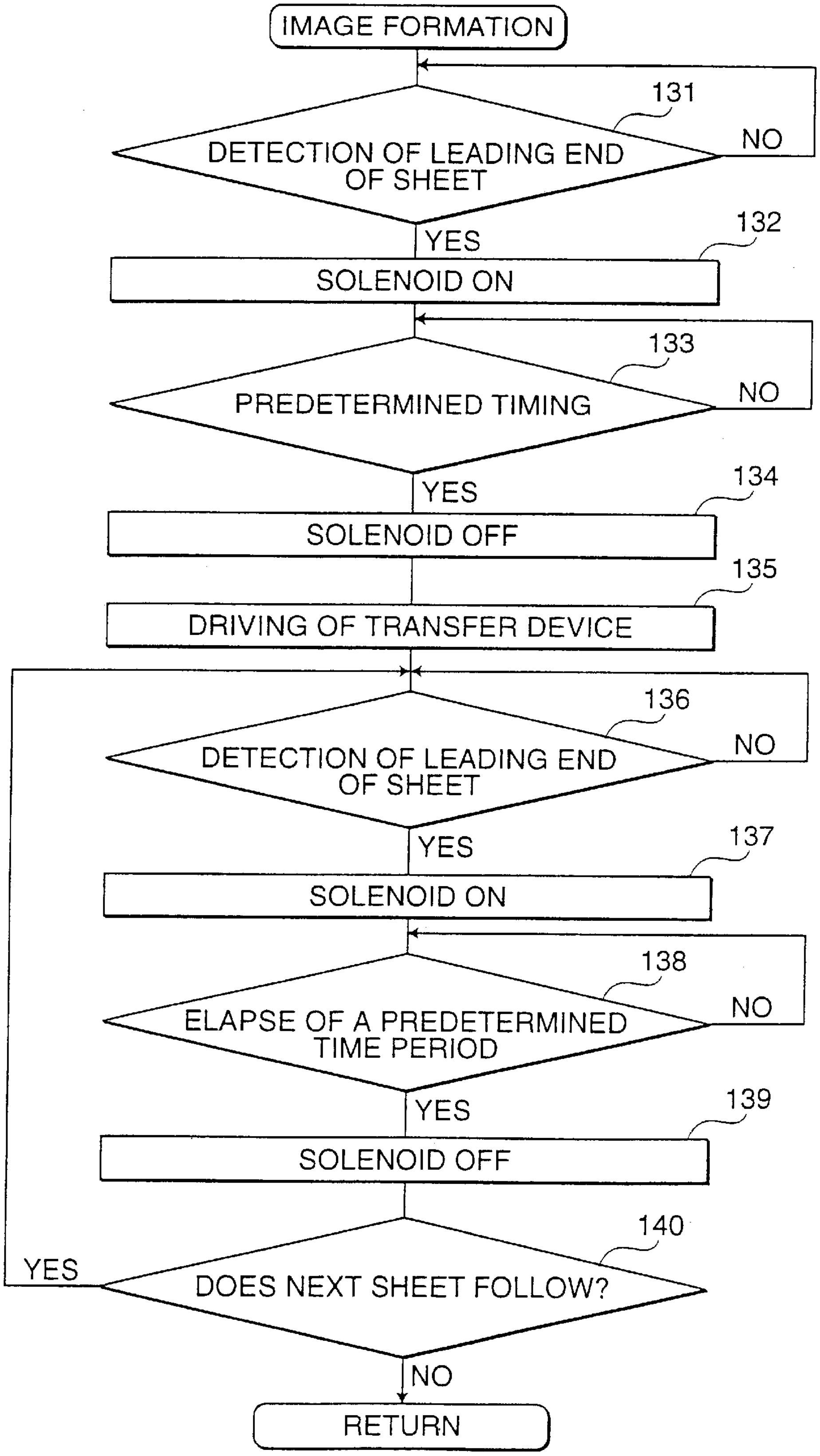
FIG. 9 is a flow chart illustrating operational steps of image formation included in the multiple operation in the control unit.
Figure 10A:
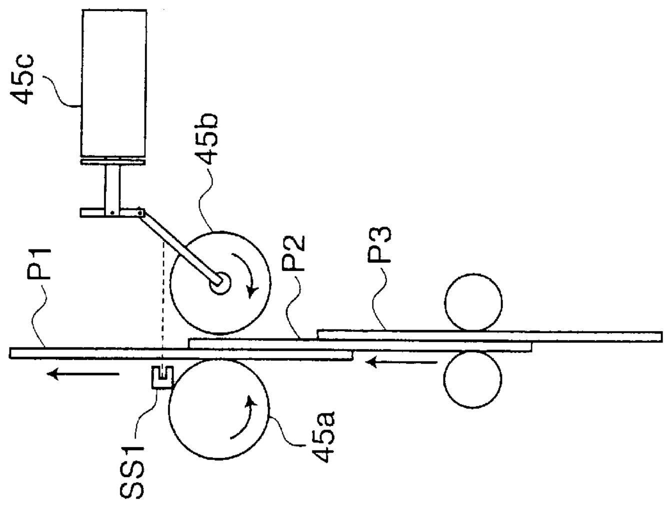
FIGS. 10(A) to 10(C) illustrate states in which sheets of paper are being transported in the image formation.
Figure 10B:
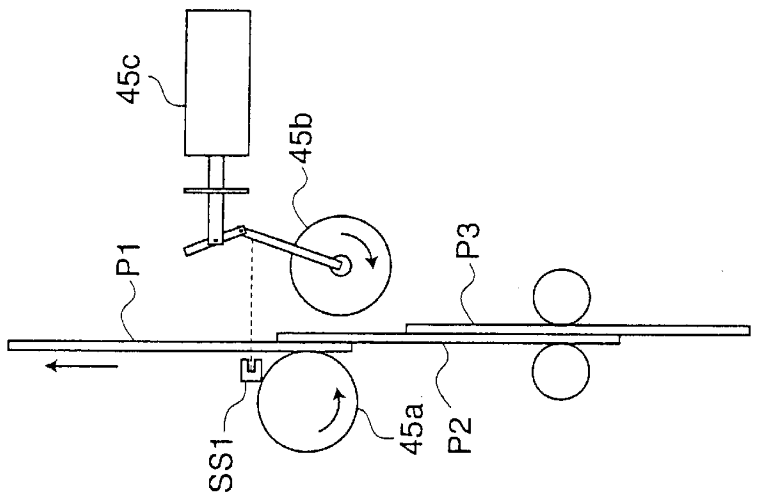
Figure 10C:
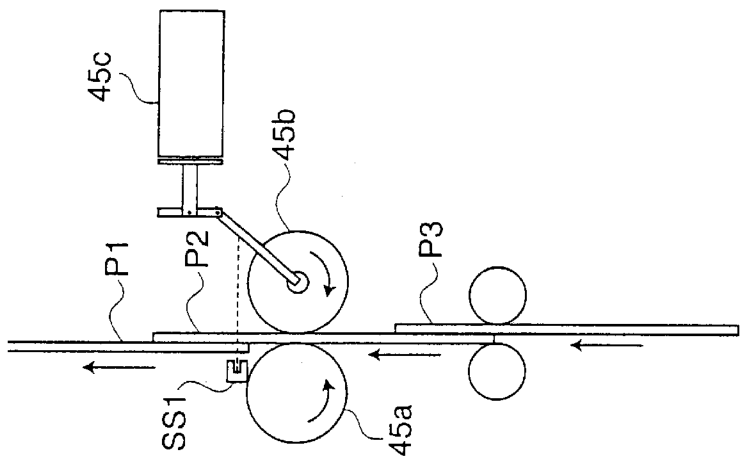

FIG. 9 is a flow chart illustrating operational steps of image formation included in the multiple operation in the control unit, and FIGS. 10(A) to 10(C) illustrates paper transport states in this image formation. In the case where the image formation according to the leading end multiple operation is performed using multiple image data produced from image data to be formed on a plurality of sheets of paper fed continuously with deleting blanks at the leading end portions from image data for the second and following pages, the control unit drives the electric charger 32, the developing unit 34 and the charge remover 36 and also supplies the multiple image data to the scan unit 33, thereby forming image of the developer based on the multiple image data sequentially on the surface of the photoconductive drum 31. In this state, the control unit turns on the solenoid 45*c* to stop the transport of sheets of paper P1 to P3 (steps 131 and 132) when the first paper sensor SS1 detects the leading end of the first sheet P1. Thereafter, the control unit turns off the solenoid 45*c* at a predetermined timing and also drives the transfer device 35 (steps 131 to 135), and re-starts the transport of the sheets P1 to P3 at timing such that the leading end of the first sheet P1 agrees with the leading end of the image of the developer carried on the photoconductive drum 31 at the transfer position. This state is shown in FIG. 10(A). Thereby, the image of the developer is transferred onto the first sheet P1.

Meanwhile, the control unit turns on the solenoid 45*c* (steps 136 and 137) to stop the transport of the sheets P2 and P3 when the first paper sensor SS1 detects the leading end of the second sheet P2. This state is shown in FIG. 10(B). The interval of rotations of the pick-up roller 43 or 48 in the paper feed operation is set to be longer than a time period for transporting a sheet of paper from the resist rollers 45 to the transfer position. Therefore, when the first paper sensor SS1 detects the leading end of the second sheet P2, the leading end of the first sheet P1 has passed through the transfer position. Accordingly, the first sheet P1 is continuously transported in the main transport route 4*a* even when the supply of the transporting force from the resist rollers 45 is stopped, and the image of the developer is continuously formed on the first sheet P1.

The control unit turns off the solenoid 45*c* which has been turned on in the aforesaid step 137 (steps 138 and 139) when a predetermined time has elapsed after the solenoid 45*c* is turned off in the aforesaid step 134. This predetermined time is a time period necessary for transporting a sheet of paper of a length equal to the total length of the sheet of paper in the transport direction from which the length of a blank on the leading end side of the second sheet P2 is deducted. This state is shown in FIG. 10(C). Thereby the transporting force by the resist rollers 45 is supplied to the sheets P2 and P3, and the second sheet P2 is transported to the transfer position with the tail end portion of the first sheet P1 lying on the blank on the leading end side of the second sheet P2. Accordingly the image of the developer based on the image data for the second page from which the blank on the leading end side is deleted is transferred onto the second sheet P2 with a blank of the same area as that of the initial image data on the leading end side.

The control unit repeats the above-described steps 136 to 139 on the third and onward pages (steps 140→136), thereby passing all sheets of paper in the number required for the commanded copy operation through the transfer position with the tail end portions of preceding sheets being overlapped on blanks on the leading end side of the following sheets.

Figure 11:
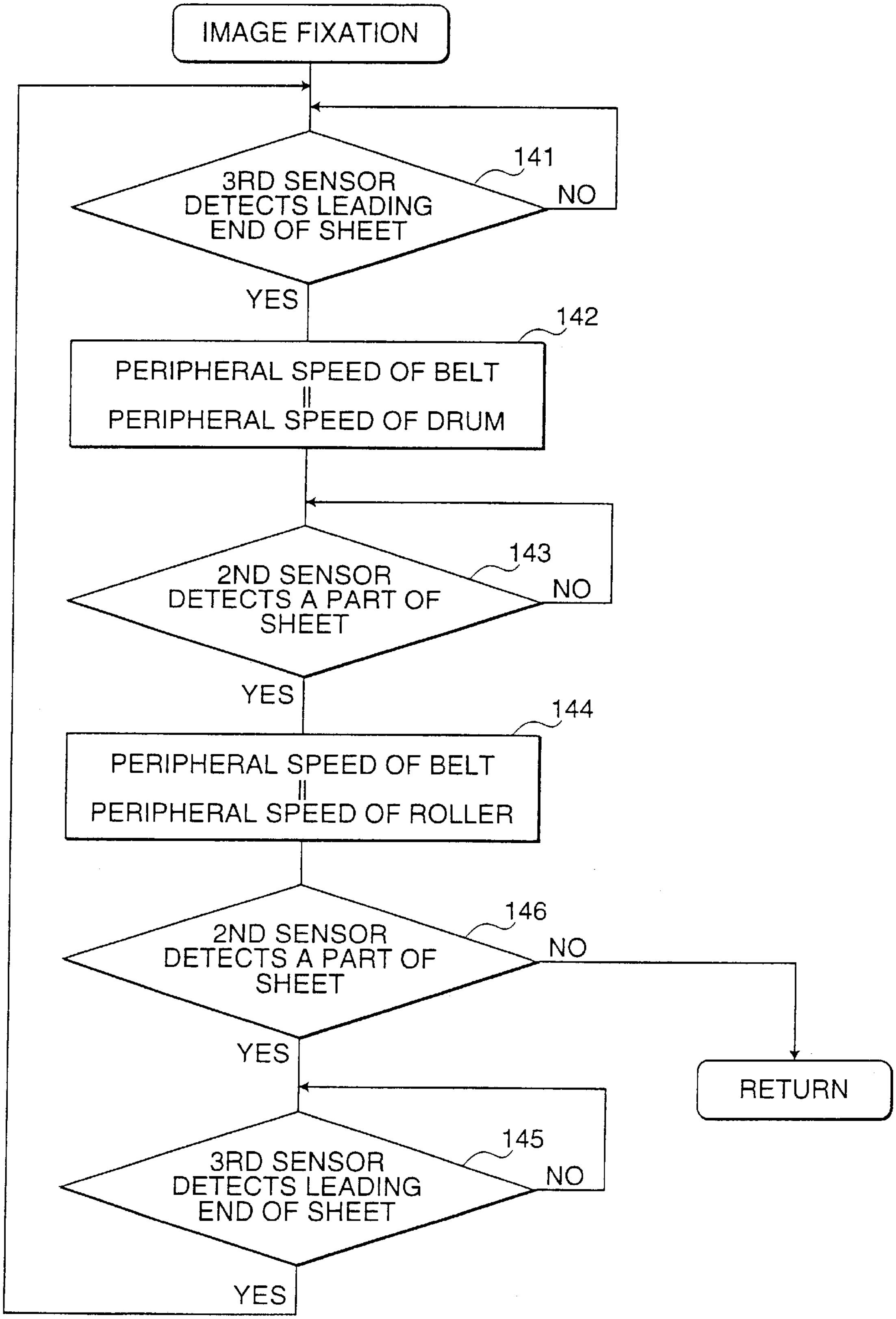
FIG. 11 is a flow chart illustrating operational steps of image fixation included in the multiple operation in the control unit.
Figures 12A, 12B, 12C:
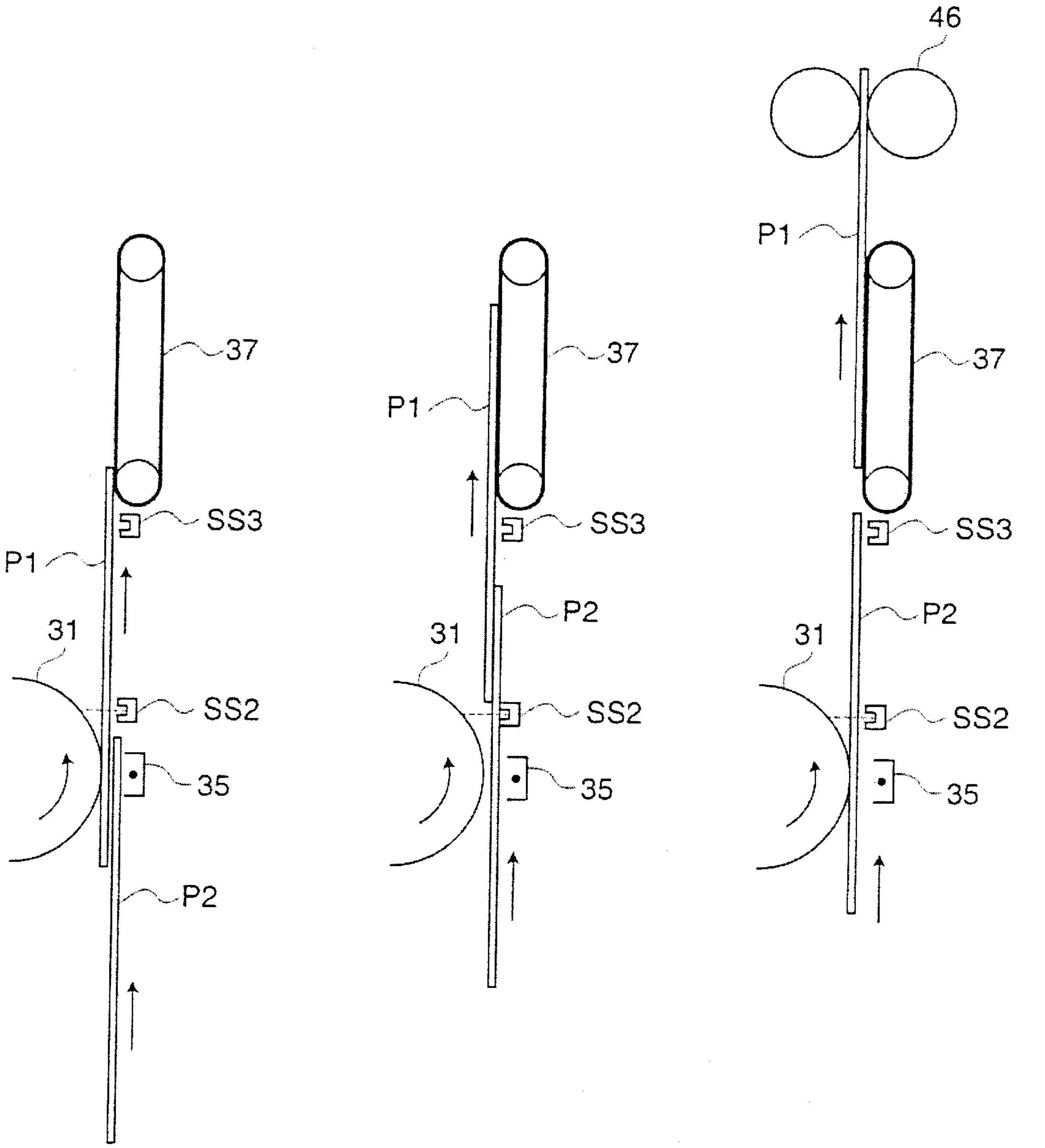
FIGS. 12(A) to 12(C) illustrate states in which sheets of paper are being transported in the image fixation.

FIG. 11 is a flow chart illustrating operational steps of image fixation included in the multiple operation in the control unit, and FIGS. 12(A) to 12(C) illustrates paper transport states in the image fixation. As described above, the peripheral speed of the fixation roller 46 is set higher than the peripheral speed of the photoconductive drum 31 defined by the process speed. The control unit makes the peripheral speed of the variable-speed belt 37 equal to that of the photoconductive drum 31 (steps 141 and 142) when the third paper sensor SS3 detects the leading end of the preceding sheet P1. When the leading end of the preceding sheet P1 reaches the position of the third paper sensor SS3, the tail end of the preceding sheet P1 has not passed through the transfer position yet, and the preceding sheet P1 continues to be transported together with the following sheet P2 at the process speed defined by the peripheral speed of the photoconductive drum 31. This state is shown in FIG. 12(A).

Subsequently, when the second paper sensor SS2 detects the tail end of the preceding sheet P1, the control unit makes the peripheral speed of the variable-speed belt 37 equal to that of the fixation roller 46 (steps 143 and 144). This state is shown in FIG. 12(B). Thereby, the sheet P1 which has passed through the transfer position entirely is transported toward the fixation roller 46 faster than the following sheet P2 which is being transported at the process speed. Accordingly, the overlap amount of the preceding sheet on the leading end portion of the following sheet P2 gradually decreases.

Thereafter, when the third paper sensor SS3 detects the leading end of the following sheet P2, the control unit makes the peripheral speed of the belt 37 equal to that of the photoconductive drum 31 (steps 145→141). When the leading end of the following sheet P2 reaches the position of the third paper sensor SS3, the leading end of the forward sheet P1 has reached the fixation roller 46 and the preceding sheet P1 is transported at the peripheral speed of the fixation roller 46 regardless of the peripheral speed of the variable-speed belt 37. On the other hand, the following sheet P2 is transported at a speed equal to the peripheral speed of the photoconductive drum 31 until its tail end passes through the transfer position. This state is shown in FIG. 12(C). Thereby, the overlap amount of the preceding sheet P1 on the leading end portion of the following sheet P2 further decreases. The tail end of the preceding sheet P2 separates from the leading end of the following sheet P2 before the leading end of the following sheet P2 reaches the position of the third paper sensor SS3. Thus the two sheets do not pass through the fixation roller 46 with overlapping with each other.

The control unit, after making the peripheral speed of the belt 37 equal to that of the photoconductive drum 31 in the aforesaid steps 145→141, judges whether the second paper sensor SS2 detects part of the next sheet. The control unit repeats the above-described steps 141 to 145 until the second paper sensor SS2 does not detect part of the next sheet (step 146). Thus all the sheets regarding the commanded copy operation can be passed through the fixation roller 46 without overlapping with each other.

The spacing between the photoconductive drum 31 and the fixation roller 46 needs to be at least longer than the length of the sheet in the transport direction. If this spacing is shorter than the length of the sheet, the leading end of the sheet is transported faster than its tail end, which may break the sheet.

As described above, in the digital copier 1 according to this embodiment, the single piece of multiple image data is produced by deleting data corresponding to blanks at the leading end portions from the image data to be formed on the second and following sheets of a plurality of sheets of paper fed continuously. Electrophotographic image formation is performed on the basis of the multiple image data, and also the overlap amount of sheets passing through the transfer position is controlled according to the length of the deleted blank in the transport direction. Thus the plurality of sheets of paper are passed through the transfer position with the tail end portions of preceding sheets lying on the blanks of the leading end portions of following sheets.

Thereby, in the digital copier 1 according to this embodiment, the length in the transport direction occupied by the plurality of sheets can be shortened to a minimum to an extent such that the initial image data can be faithfully reproduced on the sheets. Therefore, time required for the copy operation can be reduced remarkably. The multiple image data can be easily produced by deleting the data corresponding to blanks from the image data to be formed on the second and following sheets and then connecting all the image data sequentially. Further, the overlapping of the sheets according to the lengths of the blanks can be easily realized by supplying the transporting force from the resist rollers 45 to the sheets selectively according to the length of the blanks deleted from the image data at the production of the multiple image data.

Further, in the digital copier 1 according to this embodiment, the sheets are passed separately at the fixation roller 46 by transporting a preceding sheet having passed the transfer position at a higher speed than the transport speed of the following sheet with use of the variable-speed belt 37 and the fixation roller 37. Thus the fixation roller does not heat or press the sheets overlapped with each other, and therefore, the adhesion of the sheets which might otherwise cause failure in paper output does not occur. Further, the variable-speed belt 37 whose peripheral speed is changeable is disposed between the photoconductive drum 31 and the fixation roller 46 and the paper transport speed can be changed via the variable-speed belt 37. Therefore, even when a difference is produced between the peripheral speed of the variable-speed belt 37 and the paper transport speed by bringing the peripheral speed of the variable-speed belt 37 in agreement with the peripheral speed the photoconductive drum 31, which is slower than that of the fixation roller 46 after the leading end of the preceding sheet of paper reaches the fixation roller 46, the sheet moves frictionally on an upper face of the variable-speed belt 37 and does not break as in the case where rollers are used instead.

However, in the case where the overlap amount of sheets is large, that is, where the image data has a blank long in the transport direction, the photoconductive drum 31 and the fixation roller 46 are disposed at a sufficiently large spacing. More preferably, the variable-speed belt 37 is rotated at the same peripheral speed as that of the photoconductive drum 31, and in addition to that, a transport roller which rotates at the same peripheral speed as that of the fixation roller 46 should be disposed oppositely to the upper face of the variable-speed belt 37.

Further, in this digital copier 1, a plurality of sheets of paper are overlapped with each other when they are fed from the paper feed cassette 41 or the manual paper feed tray 42, by controlling the rotation of the pick-up roller 43 or 48. Thus the transport of overlapped sheets can be easily realized. Further, in the paper feed cassette 41 and the manual paper feed tray 42, the sheets are sandwiched by the springy force between the supporting plate 41*a* and the arc portion on the peripheral surface of the partially arc-formed pick-up roller 43 and 48. Thus, even if part of the topmost sheet of paper remains in the paper feed cassette 41 or the manual paper feed tray 42, the second and following sheets can be sequentially fed by frictional force between sheets. Therefore, the transport of overlapped sheets can be realized extremely easily.

In addition to the above, in this digital copier 1, the transporting force from the resist rollers to the sheets is turned on/off according to the detection results obtained by the first paper sensor SS1 and the length of the blank deleted from the image data for each page. Thus the overlap amount of the sheets fed from the paper feed cassette 41 or the manual paper feed tray 42 can be easily brought in precise agreement with the length of the blank deleted from the image data.

Further, the resist rollers 45 are composed of a pair of rollers, of which the follower roller 45*b* is capable of abutting and separating from the other, i.e., the drive roller 45*a*, and when a drive power is on, the follower roller 45*b* is separated from the drive roller 45*a*. Therefore, the transporting force can be easily adjusted so that the overlap amount of the sheets agrees with the length of the blank deleted from the image data, by controlling the timing of driving the solenoid 45*c* and the driving time period thereof.

Furthermore, a release member for releasing sheets having the transferred images of the developer thereon from the peripheral surface of the photoconductive drum 31 is preferably provided on a fixation roller 46 side of the peripheral surface of the photoconductive drum 31. However, in the leading end multiple operation, by releasing the first sheet of paper by the release member, the second and following sheets can be released from the peripheral surface of the photoconductive drum 31 sequentially with their preceding sheets. Thus, in the leading end multiple operation, a time period of operating the release member can be shortened as compared with a time period for passing the sheets through the transfer position. Mechanical damage to the photoconductive drum 31 by the release member can also be reduced.

In the digital copier 1 according to the above-described embodiment, the leading end multiple operation has been explained in which the tail end portion of the preceding sheet is laid on the leading end portion of the following sheet. However, the present invention can be practiced similarly in the case of the tail end multiple operation in which the leading end portion of the following sheet is laid on the tail end portion of the preceding sheet.

The pick-up rollers 43 and 48 need to be rotated at a relatively low speed in order to ensure the feeding of a sheet by the rotation of the pick-up rollers 43 and 48. On the other hand, they need to be rotated at a relatively high speed in order that two sheets is overlapped by the length corresponding to the blank in the image data. Therefore, as the pick-up rollers 43 and 48, high-speed multi-step pick-up rollers driven at a plurality of rotation speeds may be so mounted to be able to be abutted on and separated from the upper face of sheets of paper accommodated in the paper feed cassette 41 and the manual paper feed tray 42.

Figure 13:
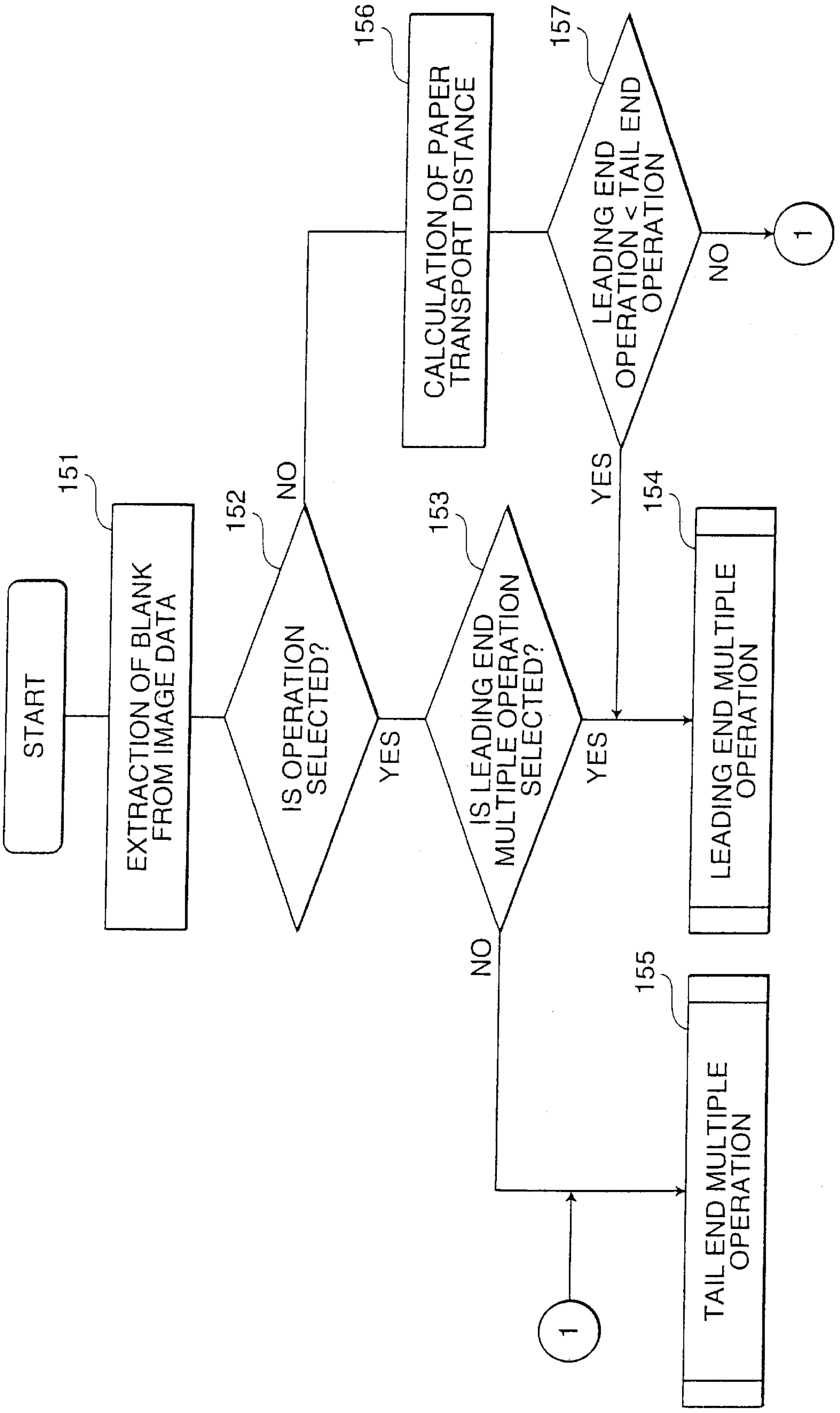
FIG. 13 is a flow chart illustrating operational steps in a control unit of a digital copier in accordance another embodiment of the present invention.

Further, the leading end multiple operation and the tail end multiple operation may be selectively carried out according to a selective input by an operator or on the basis of a result of comparison of time periods of image formation. In this case, as shown in FIG. 13 for example, blanks on the leading and tail end sides are extracted from the image data to be formed on a plurality of sheets of paper (step 151). If the operator selects either one of the leading end multiple operation and the tail end multiple operation, the operation selected by the operator is carried out (steps 152, 153 to 154, 155). If the operator does not select either one, the distance from the leading end of the head page to the tail end of the last page is calculated (step 156) concerning both the leading end multiple operation and the tail end multiple operation, and the operation which provides a shorter calculated distance is selected and carried out (steps 157→154, 155).

Figure 14A:
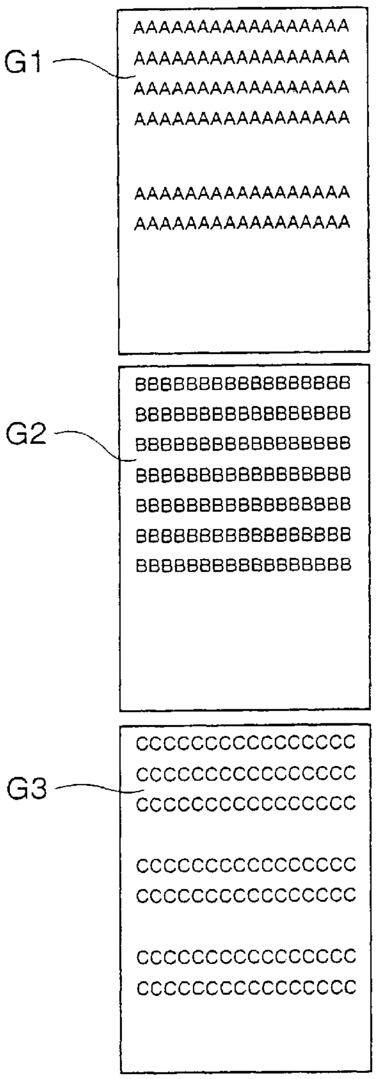
FIGS. 14(A) and 14(B) illustrate image data and a pager transporting state at a tail end multiple operation in a digital copier in accordance with an embodiment of the present invention.
Figure 14B:
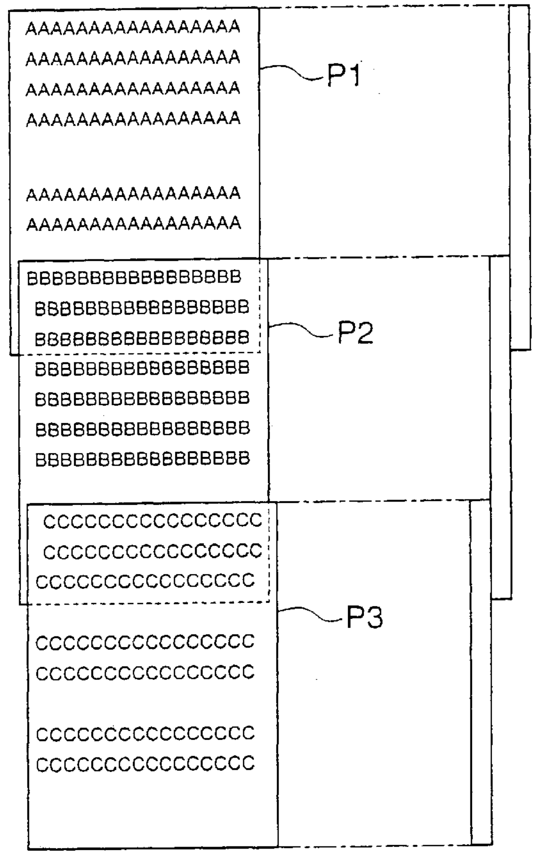
Figure 15A:
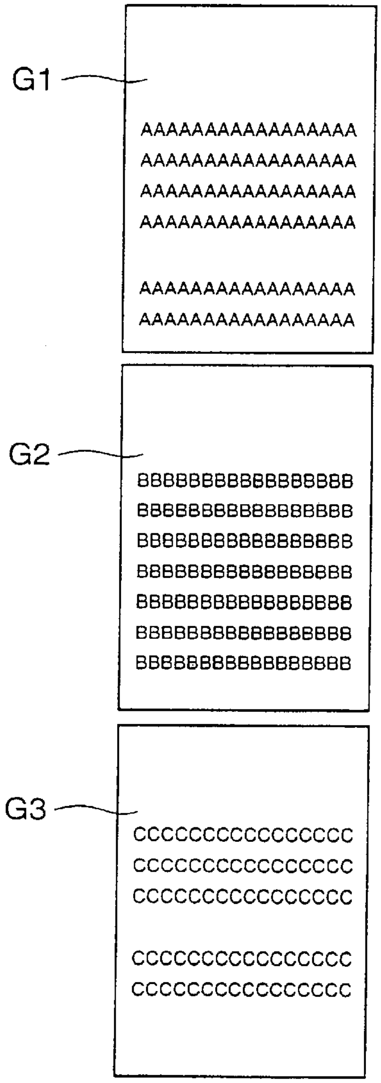
FIGS. 15(A) and 15(B) illustrate image data and a pager transporting state at a leading end multiple operation in the digital copier.
Figure 15B:
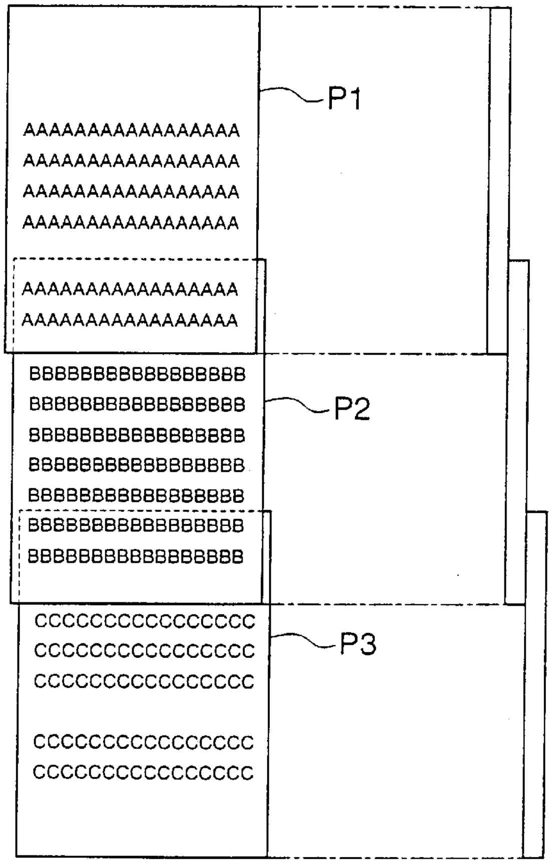
Figure 16A:
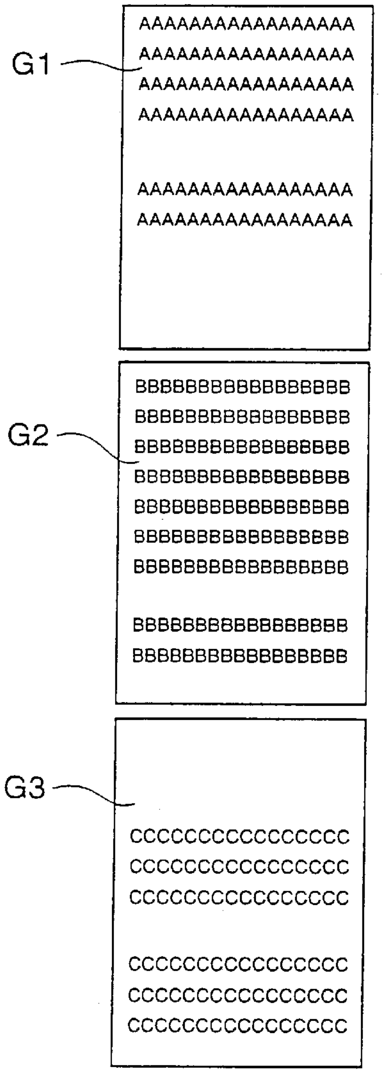
FIGS. 16(A) and 16(B) illustrate image data and a pager transporting state at a mixed operation of the tail end multiple operation and the leading end multiple operation in the digital copier.
Figure 16B:
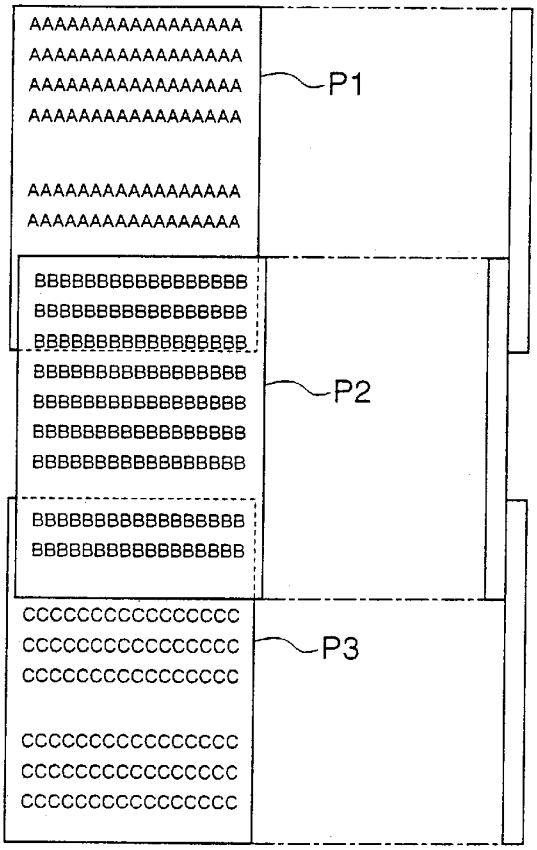

Also, it may be judged about every sheet where a blank is to be formed, on the leading end side or the tail end side of the sheet. The leading end multiple operation and the tail end multiple operation may be selectively carried out on every sheet according to the judgment result. For example, as shown in FIGS. 14(A) and 14(B), in the case where blanks are present in the tail end side in image data G1 to G3 for three original pages, the tail end multiple operation is carried out in which the leading end portions of the second and third sheets P2 and P3 are laid on the tail end portions of the first and second sheets P1 and P2, respectively. In the case where blanks are present on the leading end side in image data G1 to G3 for three original pages, as shown in FIGS. 15(A) and 15(B), the leading end multiple operation is carried out in which the tail end portions of the first and second sheets P1 and P2 are laid on the leading end portions of the second and third sheets P2 and P3, respectively. Further, in the case where image data G1 for the first page has a blank on its tail end side, image data G2 of the second page has no blanks and image data G3 for the third page has a blank on its leading end side, as shown in FIGS. 16(A) and 16(B), the tail end multiple operation is carried out on the first and second sheets P1 and P2 and the leading end multiple operation is carried out on the second and third sheets P2 and P3.

In the case where the leading end multiple operation or the tail end multiple operation is selectively carried out according to the positions of blanks in the image data as described above, a switch means is required for selectively switching the position of the leading end portion of a sheet above or below the tail end portion of the preceding sheet in the paper accommodating section. The construction of the paper accommodating section for this purpose is now explained with regard to cases where sheets are fed from the paper feed cassette.

Figure 17A:
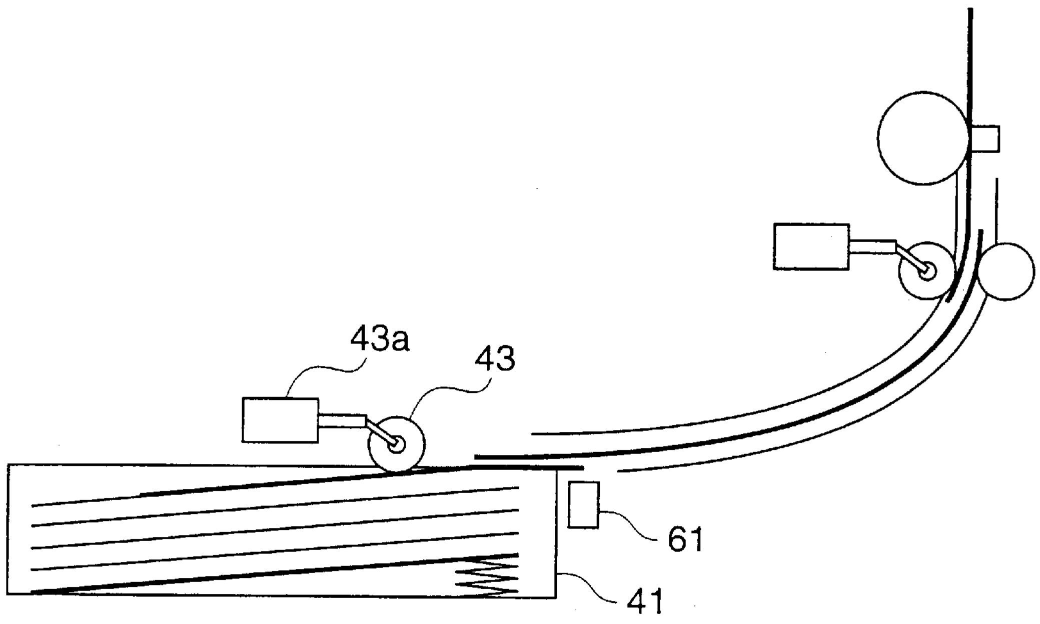
FIGS. 17(A) and 17(B) are schematic views illustrating a first constructive example of a paper feed unit of a digital copier in accordance with the present invention.
Figure 17B:
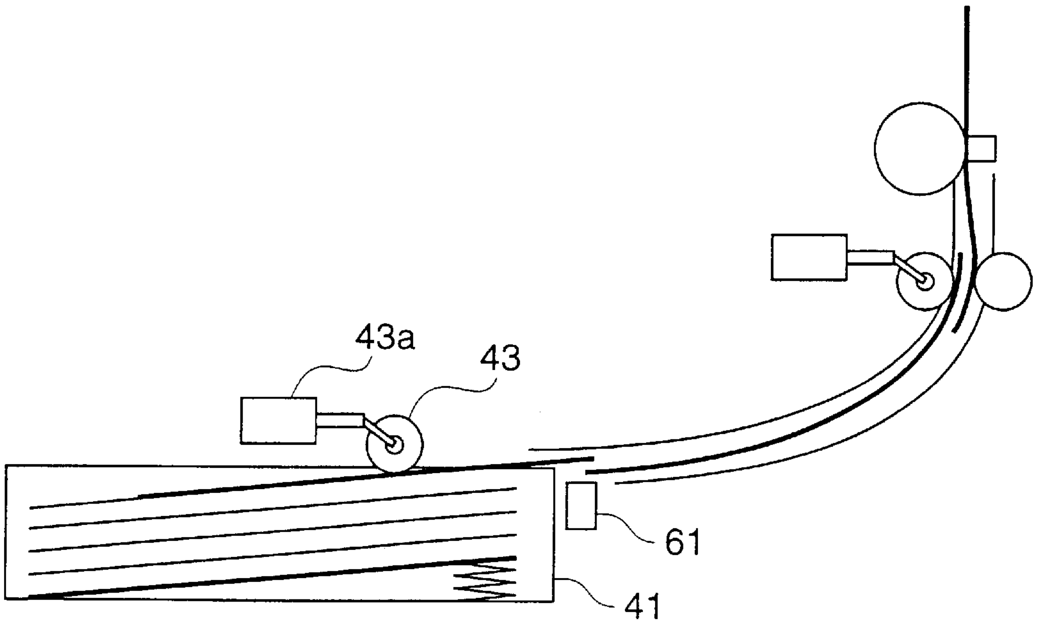

FIGS. 17(A) and 17(B) are schematic views illustrating a first example of construction of the paper accommodating section of the above-described digital copier. In this example, a paper feed sensor 61 is provided at an outlet of the paper feed cassette 41. The leading end multiple operation or the tail end multiple operation is selectively performed by starting the feed of a sheet at timing when the paper feed sensor 61 is detecting the tail end of the preceding sheet or at timing when the paper feed sensor 61 stops detecting it.

More particularly, in the leading end multiple operation, as shown in FIG. 17(A), the feed of the following sheet is started by driving a paper feed solenoid 43*a* to make the pick-up roller 43 abut to the top face at timing when the paper feed sensor 61 detects a predetermined position on the tail end side of the preceding sheet. In this case, the predetermined position of the preceding sheet to be detected by the paper feed sensor 61 when the feed of the following sheet is started is a position at a distance y2 ahead from the tail end of the preceding sheet, wherein y2 is the length in the transport direction of a blank on the leading end side in the image data for the following sheet. The timing Ta when the paper feed sensor 61 opposes to this predetermined position is calculated by:

$$Ta=T1+((L-y2)/V1),$$

wherein T1 is timing when the paper feed sensor 61 detects the leading end of the preceding sheet of paper, L is the length of the sheet in the transport direction, y2 is the length in the transport direction of the blank in the leading end portion in the image data to be formed on the following sheet and V1 is a transport speed after the feed of the preceding sheet is started. The transport of the preceding sheet of paper is stopped at this timing. Thereafter the paper feed solenoid 43*a* is driven and also the pick-up roller 43 is rotated until the paper feed sensor 61 detects the leading end of the following sheet. Thus a part of the following sheet on the leading end side where the blank is to be formed is laid under the tail end portion of the preceding sheet.

In the tail end multiple operation, as shown in FIG. 17(B), the feed of the following sheet is started when the preceding sheet of paper is sent completely out of the paper feed cassette 41. For this purpose, at timing when the paper feed sensor 61 detects the passage of the tail end of the preceding sheet, the transport of the preceding sheet is stopped, the paper feed solenoid 43*a* is driven so that the pick-up roller 43 abuts the top face of the sheets and the feed of the following sheet is started. The transport of the preceding sheet is re-started at timing when the paper feed sensor 61 detects a predetermined position on the leading end side of the following sheet. In this case, the predetermined position in the following sheet to which the paper feed sensor 61 should oppose at the timing when the feed of the preceding sheet of paper is re-started is a position at a distance y1 behind from the leading end of the following sheet wherein y1 is the length of a blank in the transport direction in the tail end side in the image data for the preceding sheet. The timing Tb when the paper feed sensor 61 opposes to this predetermined position is calculated by:

$$Tb=T2+(y1/V2),$$

wherein T2 is timing when the paper feed sensor 61 detects the leading end of the preceding sheet of paper, y1 is the length of the blank in the transport direction on the tail end side in the image data to be formed on the preceding sheet and V2 is a feeding speed of the following sheet. By re-starting the feed of the preceding sheet at the same speed as the feeding speed of following sheet of paper at this timing, the tail end portion of the following sheet is laid on a part of the preceding sheet on the tail end side where the blank is to be formed.

As described above, the overlapped state of sheets according to the state of blanks in the image data can be easily realized with a simple construction, on the basis of a detection signal of the paper feed sensor 61 provided near the outlet of the paper feed cassette 41.

Figure 18A:
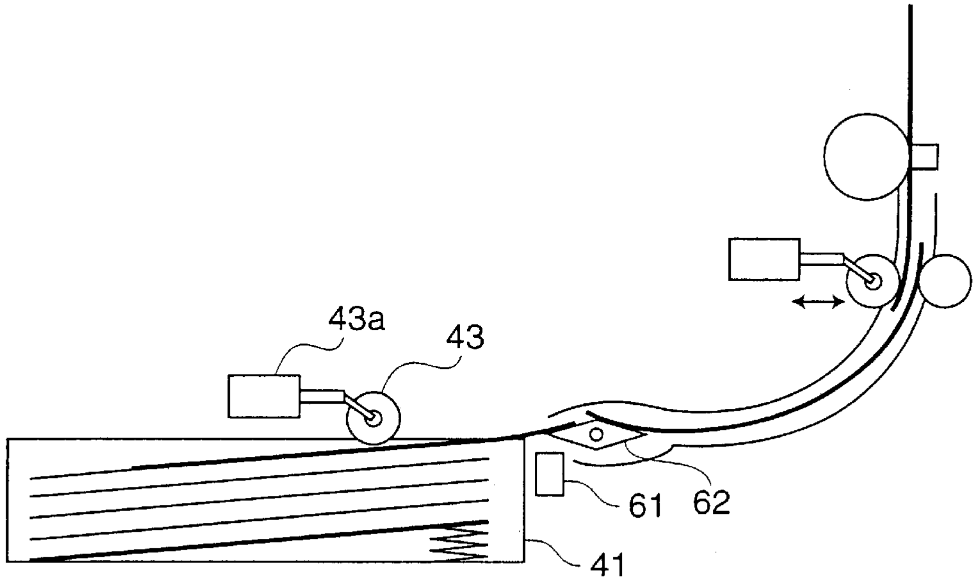
FIGS. 18(A) and 18(B) are schematic views illustrating a second constructive example of a paper feed unit of the digital copier in accordance with the present invention.
Figure 18B:
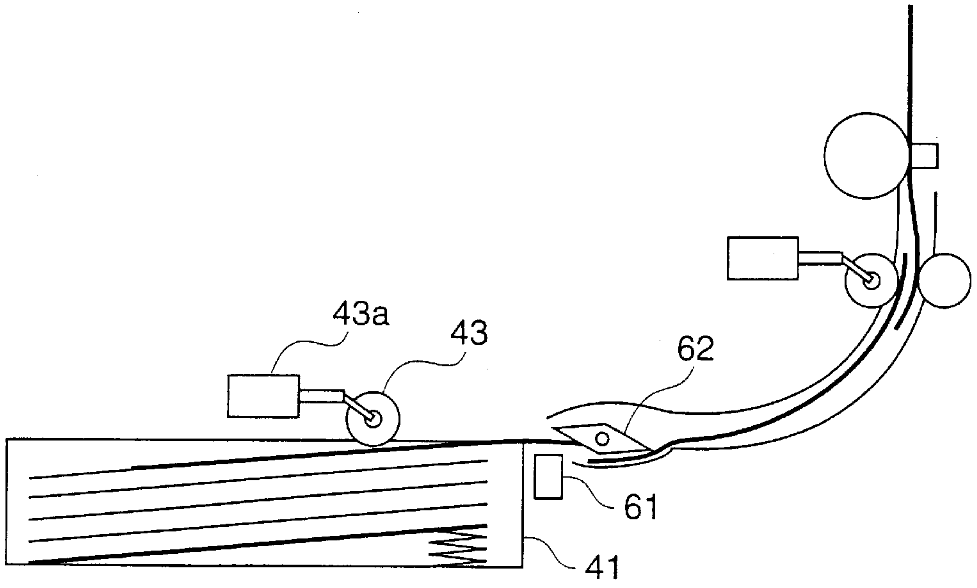

FIGS. 18(A) and 18(B) are schematic views illustrating a second example of construction of the paper accommodating section of the above-described digital copier. In this example, a paper feed sensor 61 and a distribution guide 62 are provided at the outlet of the paper feed cassette 41. The leading end multiple operation or the tail end multiple operation is selectively performed by swinging the distribution guide 62 selectively in an anticlockwise direction or in a clockwise direction to distribute the sheets from the paper feed cassette 41 above or below the distribution guide 62.

More particularly, in the leading end multiple operation, as shown in FIG. 18(A), the distribution guide 62 is swung in the anticlockwise direction to guide the following sheet from the paper feed cassette 41 above the distribution guide 62. Thus, the leading end portion of the following sheet enters between the lower surface on the tail end side of the preceding sheet and the upper surface of the distribution guide 62, so that the tail end portion of the preceding sheet lies on the leading end portion of the following sheet. On the other hand, in the tail end multiple operation, as shown in FIG. 18(B), the distribution guide 62 is swung in the clockwise direction to guide the following sheet from the paper feed cassette 41 below the distribution guide 62. Thus, the leading end portion of the following sheet enters between the upper surface on the tail end side of the preceding sheet and the lower surface of the distribution guide 62, so that the leading end portion of the following sheet lies on the tail end portion of the preceding sheet.

In addition to that, the overlap amount of the preceding sheet and the following sheet can be properly adjusted according to the state of a blank in the image data, by determining the timing of stopping the transport of the preceding sheet and the timing of restarting its transport on the basis of the length in the transport direction of the blank in the image data.

Figure 19A:
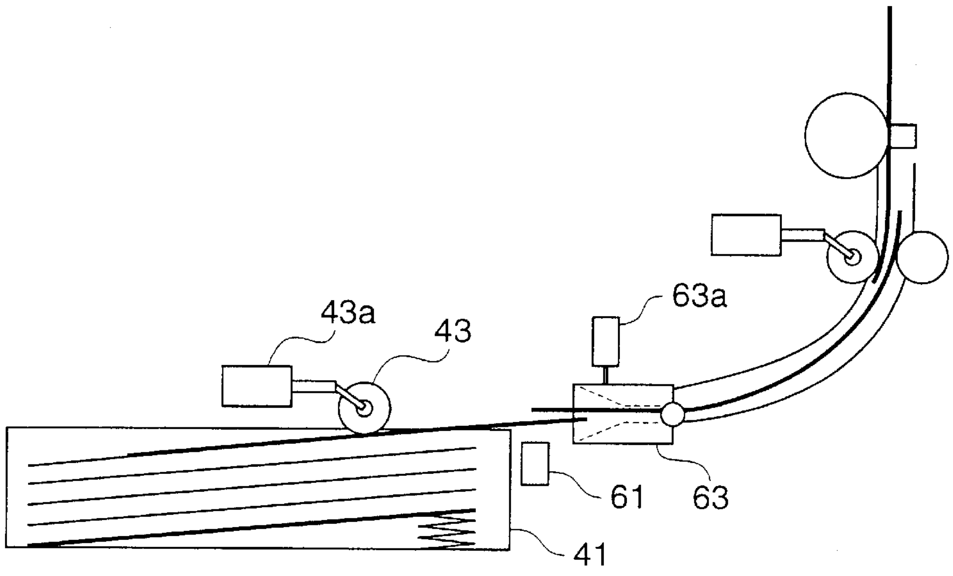
FIGS. 19(A) and 19(B) are schematic views illustrating a third constructive example of a paper feed unit of the digital copier in accordance with the present invention.
Figure 19B:
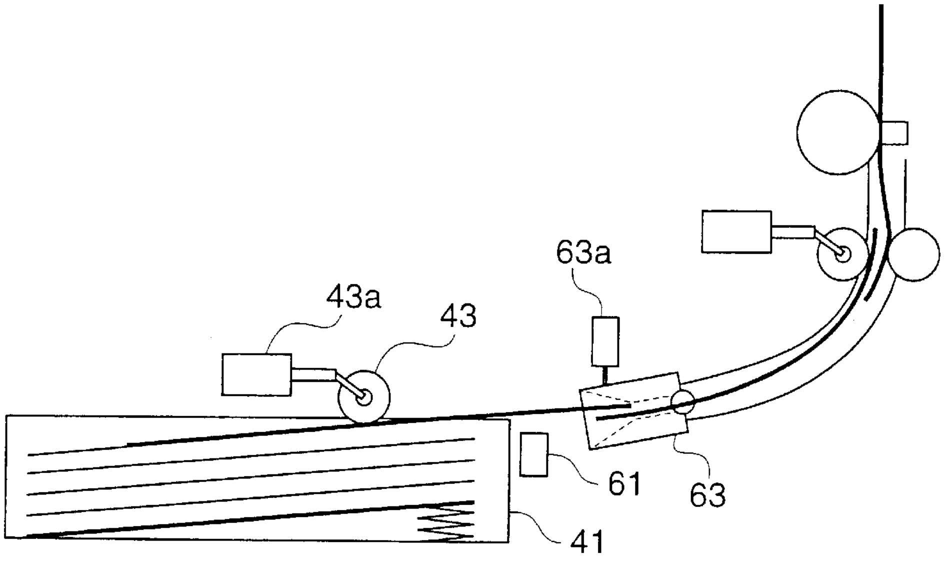

FIGS. 19(A) and 19(B) are schematic views illustrating a third example of construction of the paper feed unit of the above-described digital copier. In this example, a guide 63 with an inside through-hole is provided vertically swingably in place of the distribution guide 62 in the second example of construction shown in FIG. 18. A solenoid 63*a* is selectively driven according to the selection of the leading end multiple operation or the tail end multiple operation to move a paper feed cassette side of the guide 63 above or below the outlet of the paper feed cassette 41. Also with this construction, similarly to the example shown in FIGS. 18(A) and 18(B), the leading end multiple operation and the tail end multiple operation can be selectively performed.

Figure 20A:
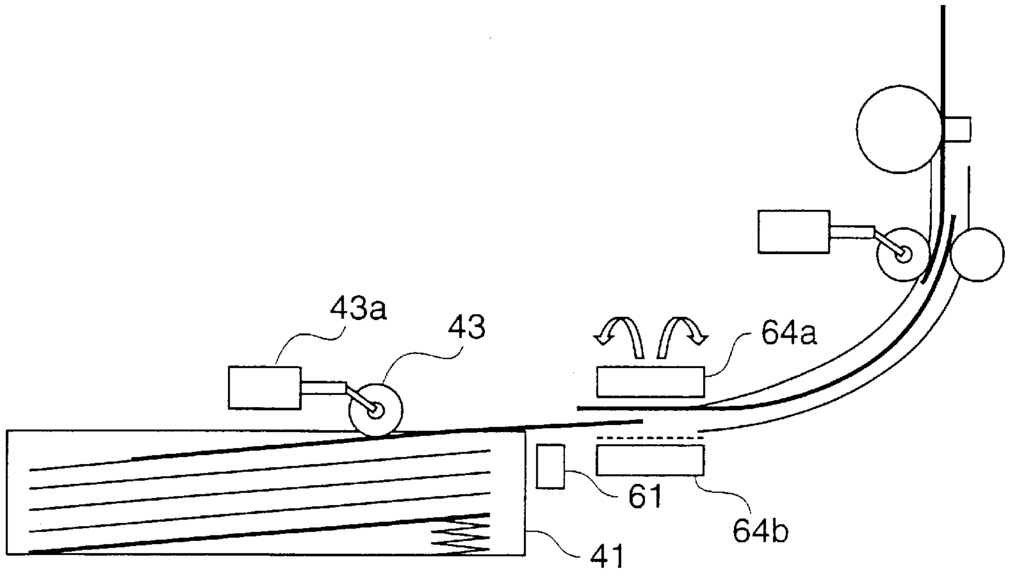
FIGS. 20(A) and 20(B) are schematic views illustrating a fourth constructive example of a paper feed unit of the digital copier in accordance with the present invention.
Figure 20B:
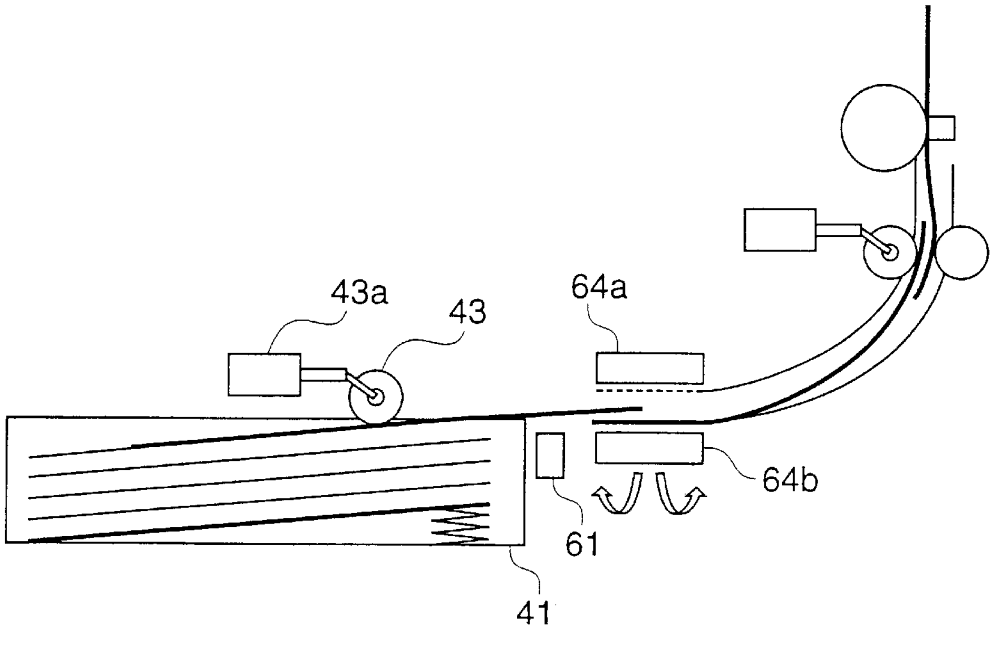

FIGS. 20(A) and 20(B) are schematic views illustrating a fourth example of construction of the paper accommodating section of the above-described digital copier. In this example, suction fans 64*a* and 64*b* are provided above and below the paper transport route in place of the distribution guide 62 in the second example shown in FIGS. 18(A) and 18(B). The upper suction fan 64*a* or the lower suction fan 64*b* is selectively driven according to the selection of the leading end multiple operation or the tail end multiple operation to suck the tail end of the preceding sheet of paper above or below the outlet of the paper feed cassette 41. Also with this construction, similarly to the example shown in FIGS. 18(A) and 18(B), the leading end multiple operation and the tail end multiple operation can be selectively performed.

Figure 21A:
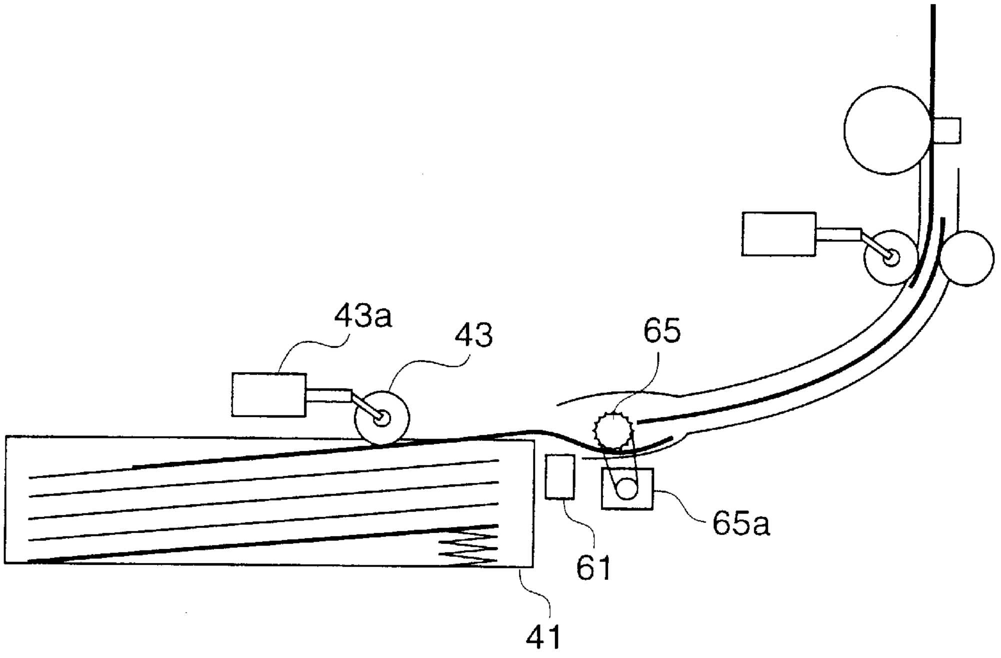
FIGS. 21(A) and 21(B) are schematic views illustrating a fifth constructive example of a paper feed unit of the digital copier in accordance with the present invention.
Figure 21B:
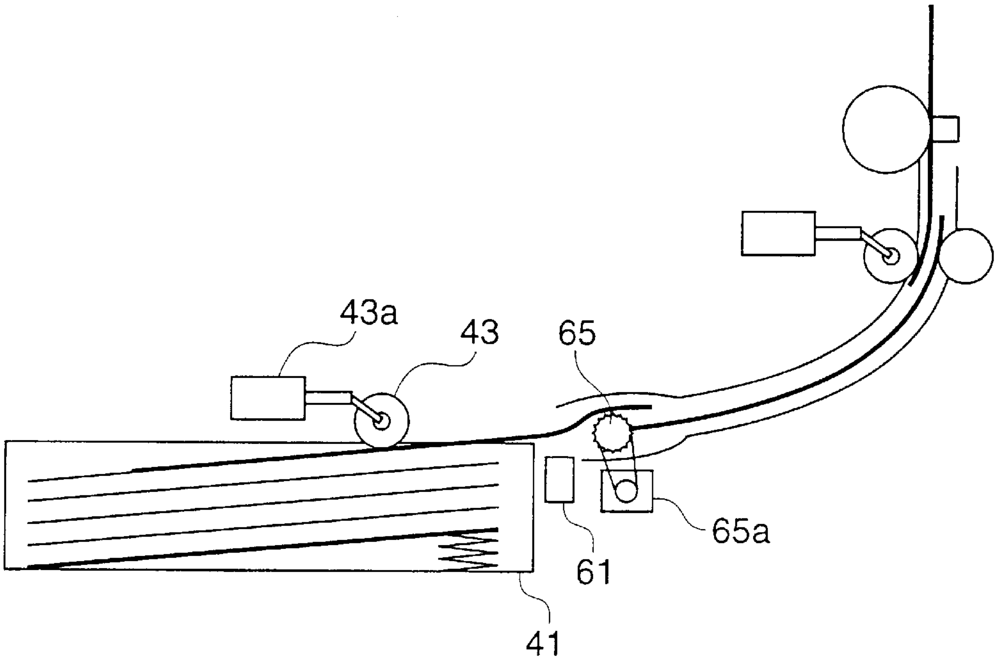

FIGS. 21(A) and 21(B) are schematic views illustrating a fifth example of construction of the paper accommodating section of the above-described digital copier. In this example, a friction roller 65 rotatable in both clockwise and anticlockwise directions is provided in place of the distribution guide 62 in the second example shown in FIGS. 18(A) and 18(B). The friction roller 65 is rotated via a motor 65*a* selectively in the clockwise direction or in the anti-clockwise direction according to the selection of the leading end multiple operation or the tail end multiple operation to guide the leading end of the following sheet above or below the preceding sheet. Also with this construction, similarly to the example shown in FIGS. 18(A) and 18(B), the leading end multiple operation and the tail end multiple operation can be selectively performed.

Figure 22A:
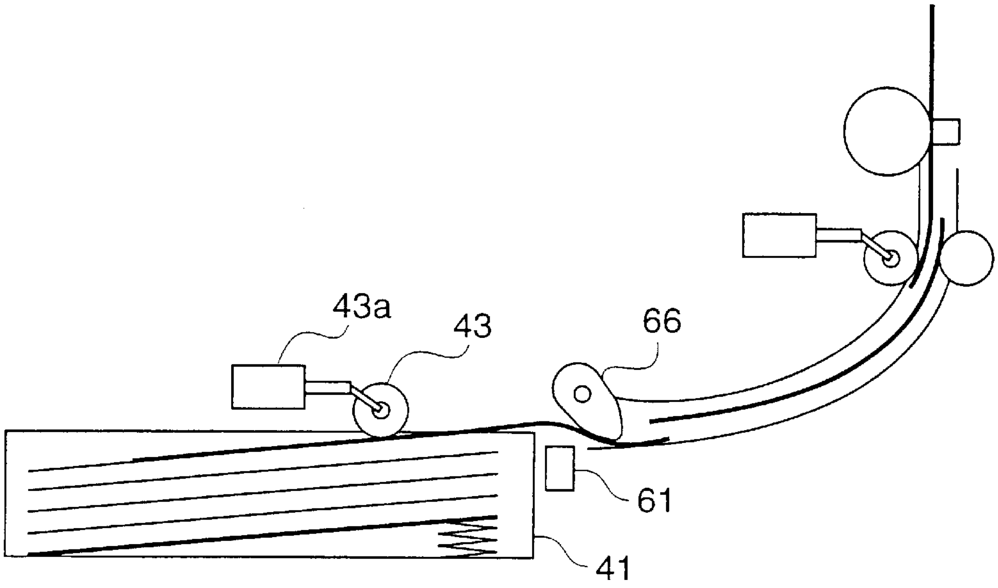
FIGS. 22(A) and 22(B) are schematic views illustrating a sixth constructive example of a paper feed unit of the digital copier in accordance with the present invention.
Figure 22B:
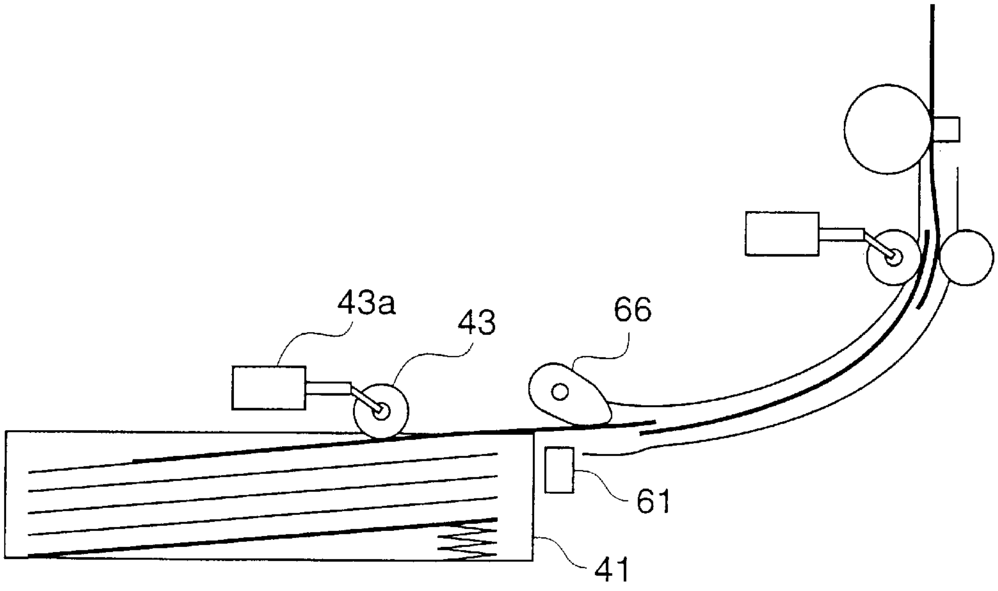
Figure 23:
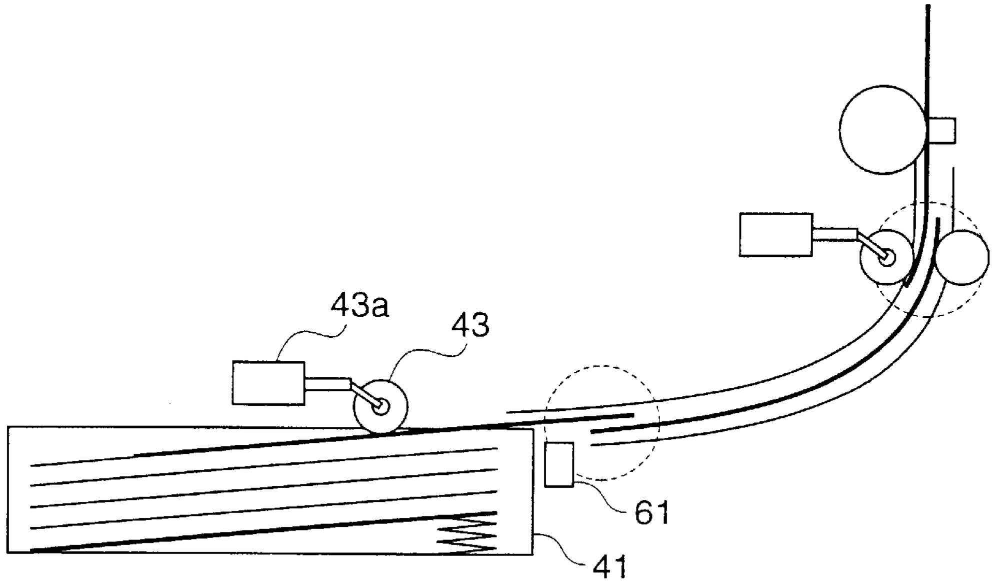
FIG. 23 is a schematic view illustrating a paper feeding state at a mixed operation in the first constructive example of the paper feed unit of the digital copier in accordance with the present invention.

FIGS. 22(A) and 22(B) are schematic views illustrating a sixth example of construction of the paper accommodating section of the above-described digital copier. In this example, a lever 66 is provided in place of the distribution guide 62 in the second example shown in FIGS. 18(A) and 18(B). A downstream side of the lever 66 can be swung vertically about its paper feed cassette side as a fulcrum. The downstream side of the lever 66 is selectively swung up or down according to the selection of the leading end multiple operation or the tail end multiple operation to guide the leading end of the following sheet above or below the preceding sheet of paper. Also with this construction, similarly to the example shown in FIGS. 18(A) and 18(B), the leading end multiple operation and the tail end multiple operation can be selectively performed.

In addition, it is also possible to perform suitable one of the leading end multiple operation and the tail end multiple operation selectively on a sheet basis according to the state of blanks in the image data for every sheet, by controlling the paper feed operation sheet by sheet. This can be realized with other examples.

FIG. 24 to FIG. 27 show another construction of the paper accommodating section of the above-described digital copier. In this example, two separate transport routes 401*a* and 401*b* separated from each other are formed between the paper feed cassette 41 and the image forming unit 3. A separation claw is provided between the paper feed cassette 41 and the separate transport routes 401*a* and 401*b*. Overlap members 405*a* and 405*b* are disposed between the resist roller 45 and the separate transport routes 401*a* and 401*b* to form an overlap section 404.

Figure 24:
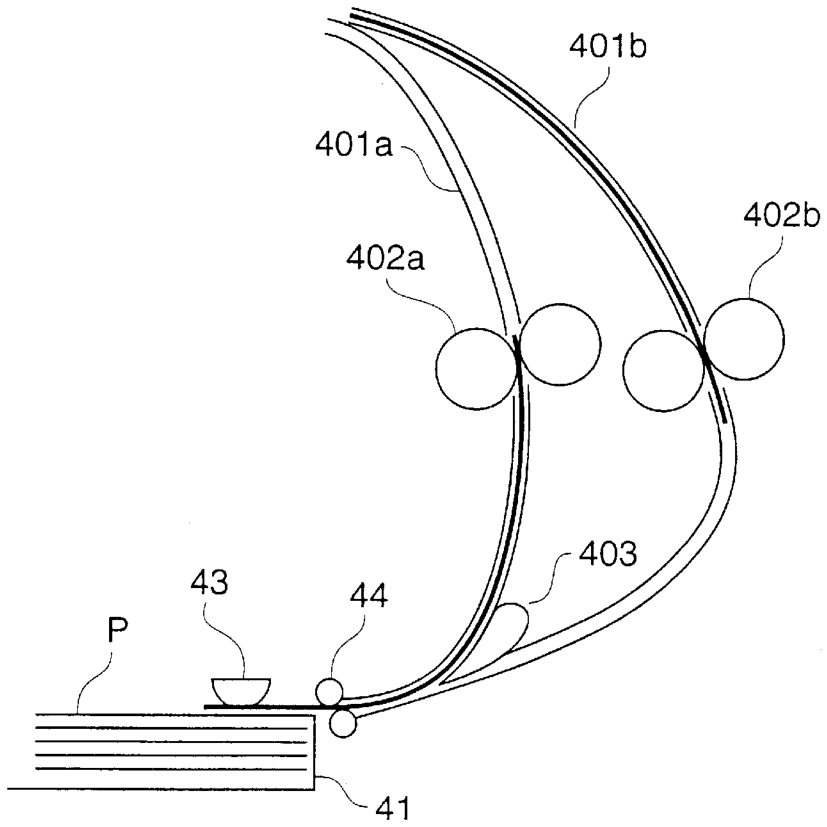
FIG. 24 is a schematic view illustrating a construction of a paper feed cassette side in another example of a paper transport unit of the digital copier in accordance with the present invention.

As shown in FIG. 24, the separation claw 403 guides sheets P fed by the pick-up roller 43 and the paper feed rollers 44 alternately to the separate transport routes 401*a* and 401*b*, which are provided with transport rollers 402*a* and 402*b*. The sheets P are transported via the separate transport routes 401*a* and 401*b* to the overlap section 404.

Thus, by sending the sheets P from the paper feed cassette 41 alternately to the separate transport routes 401*a* and 401*b*, it is possible to feed the following sheet before the preceding sheet reaches the overlap section 404 completely. Therefore the intervals of feeding a plurality of sheets of paper can be shortened, which in turn reduces the time required for the whole image formation operation.

The separation claw 403 has an upper surface formed of a curved face with the same curvature as that of a transport surface of the separate transport route 401*a* and an lower surface formed of a curved face with the same curvature as that of a transport surface of the separate transport route 401*b*. Thus, the sheet of paper P fed from the paper feed cassette 41 is smoothly guided into the separate transport route 401*a* or 401*b* by abutting on the upper or lower surface of the separation claw 403.

Figure 25:
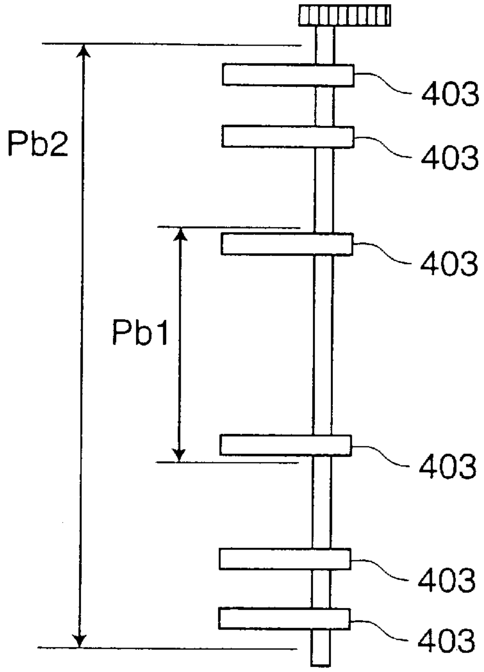
FIG. 25 is a plan view illustrating the disposition of separation claws in the paper transport unit.

As shown in FIG. 25, the separation claw 403 has a number of claw members disposed at a plurality of positions such that the claw members abut on both side edges of sheets of different sizes. For example, the claw members are disposed at a distance Pb1 for sheets with the smallest width and at a distance Pb2 for sheets with the largest width. With this construction, the sheets P fed from the paper feed cassette 41 can be reliably guided to the separate transport route 401*a* or 401*b* regardless of their size.

Figure 26:
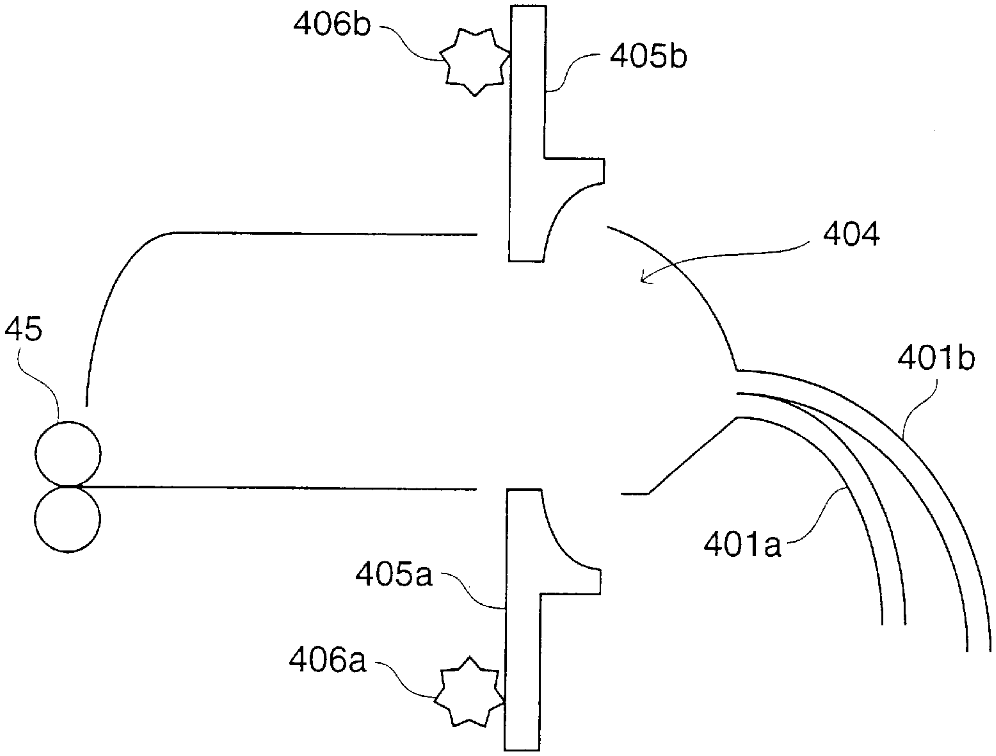
FIG. 26 is a schematic view illustrating a construction of an image forming unit side of the paper transport unit.

As shown in FIG. 26, the overlap members 405*a* and 405*b* are disposed on a lower side and on an upper side of the overlap section 404 and can be moved up and down by individual drive means 406*a* and 406*b* to be exposed in the overlap section 404. The overlap section 404 is set to be vertically broader as compared with the separate transport routs 401*a* and 401*b* so that the tail end portion of the preceding sheet can be laid either above or below the leading end portion of the following sheets in the overlap section 404.

Figure 27A:
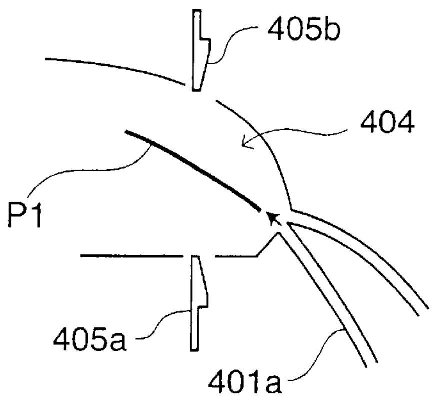
FIGS. 27(A) to 27(C) are schematic views illustrating the behavior of an overlap claw in the paper transport unit.
Figure 27B:
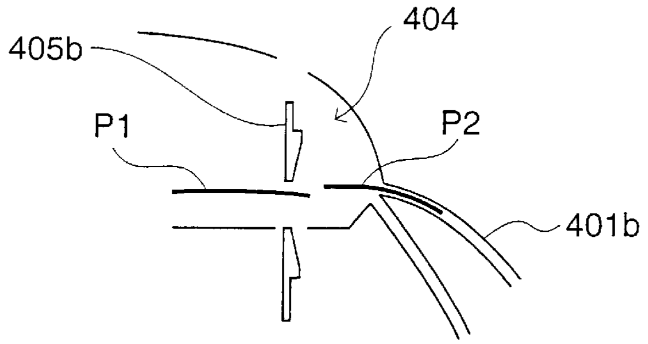
Figure 27C:
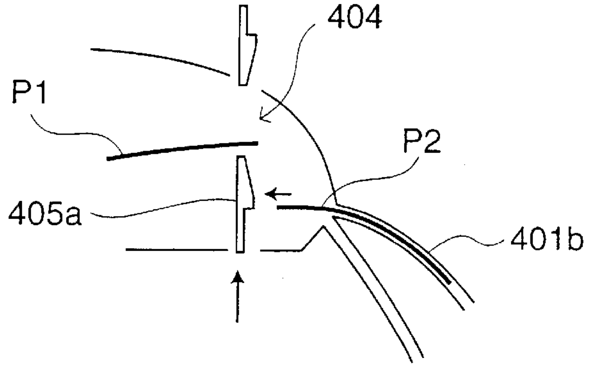

FIGS. 27(A) to 27(C) are schematic views illustrating the behavior of the overlap members. In the tail end multiple operation in which the leading end portion of the following sheet overlaps on the tail end portion of the preceding sheet, the upper overlap member 405*b* is moved downward to be exposed in the overlap section 404 after the tail end of the preceding sheet P1 transported via one of the separate transport route, e.g., 401*a*, reaches a position where the overlap members 405*a* and 405*b* oppose to each other but before the leading end of the following sheet P2 transported via the other separate transport route 401*b* reaches the position where the overlap members 405*a* and 405*b* oppose to each other. Thereby, the tail end portion of the preceding sheet P1 is pushed down below an opening of the other separate transport route 401*b* and the leading end portion of the following sheet P2 is guided above the tail end portion of the preceding sheet P1.

On the other hand, In the leading end multiple operation in which the tail end portion of the preceding sheet overlaps on the leading end portion of the following sheet, the lower overlap member 405*a* is moved upward to be exposed in the overlap section 404 after the tail end of the preceding sheet P1 transported via one of the separate transport route, e.g., 401*a*, reaches the position where the overlap members 405*a* and 405*b* oppose to each other but before the leading end of the following sheet P2 transported via the other separate transport route 401*b* reaches the position where the overlap members 405*a* and 405*b* oppose to each other. Thereby, the tail end portion of the preceding sheet P1 is pushed up above the opening of the other separate transport route 401*b* and the leading end portion of the following sheet P2 is guided below the tail end portion of the preceding sheet P1.

The overlap members 405*a* and 406*b*, like the separation claw 403, are also disposed separately at a plurality of positions in a direction orthogonal to the paper transport direction in view of transportable sheets of different sizes, so that two sheets can be accurately overlapped according to the tail end multiple operation and the leading end multiple operation.

The overlap amount of two sheets can be adjusted by controlling the timing of starting the rotation of the resist roller 45 after the leading end portion of the following sheet catches the tail end portion of the following sheet.

Figure 29:
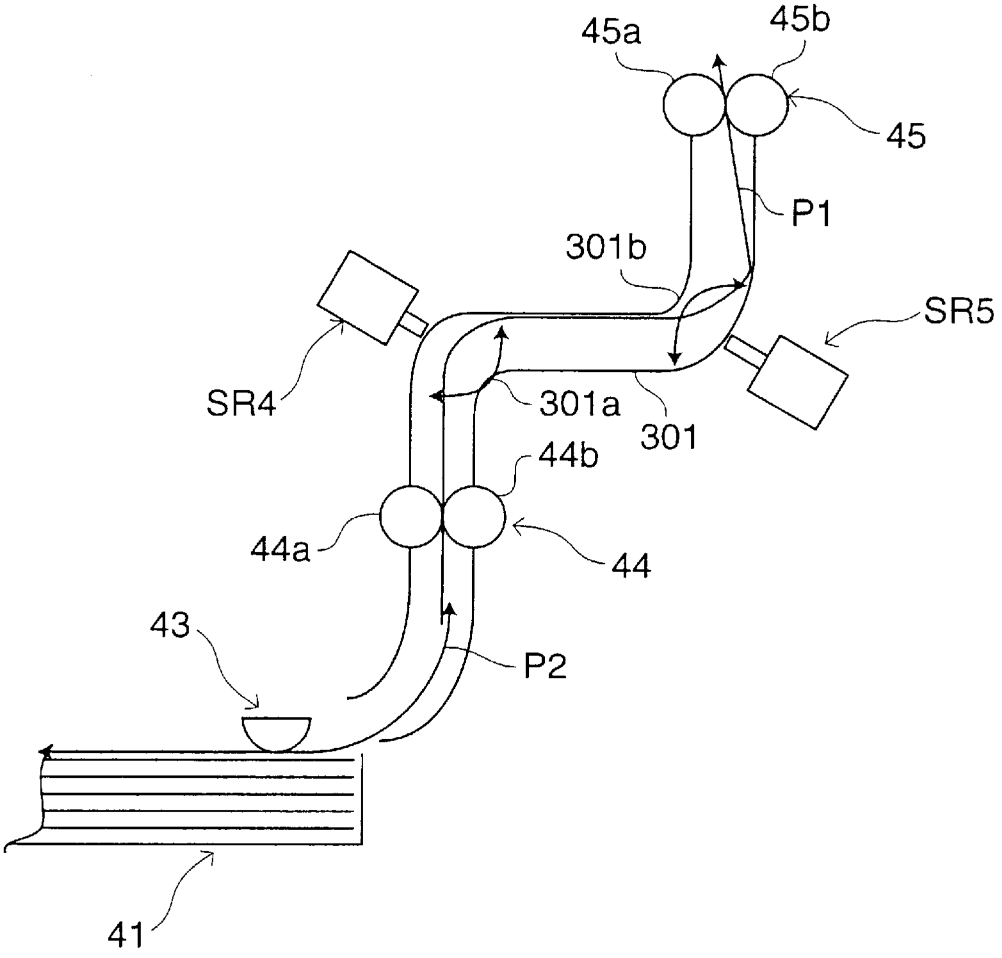
FIG. 29 is a schematic view illustrating another construction of a paper transport unit of an image forming apparatus in accordance with the present invention.
Figure 30A:
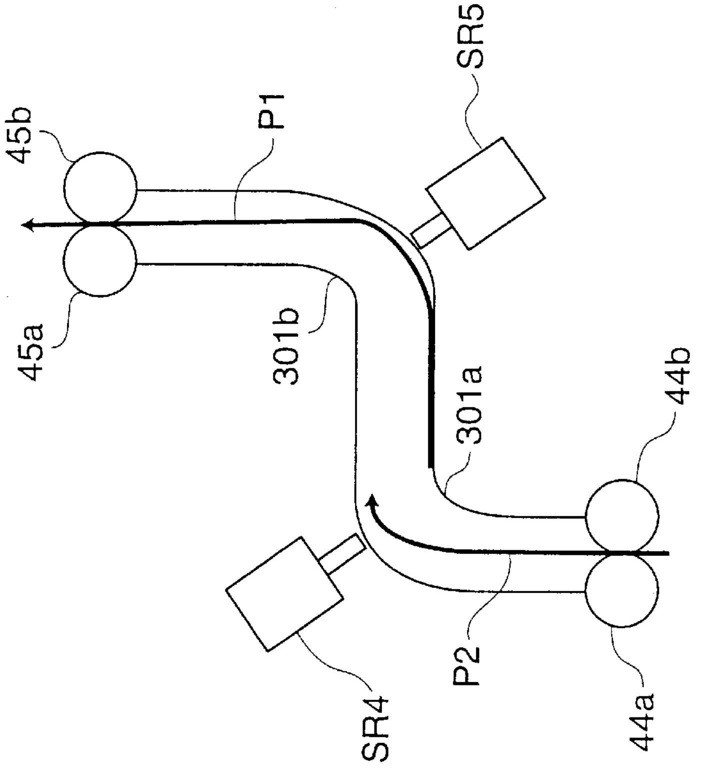
FIGS. 30(A) and 30(B) illustrate states of overlapping sheets in the paper transport unit shown in FIG. 29.
Figure 30B:
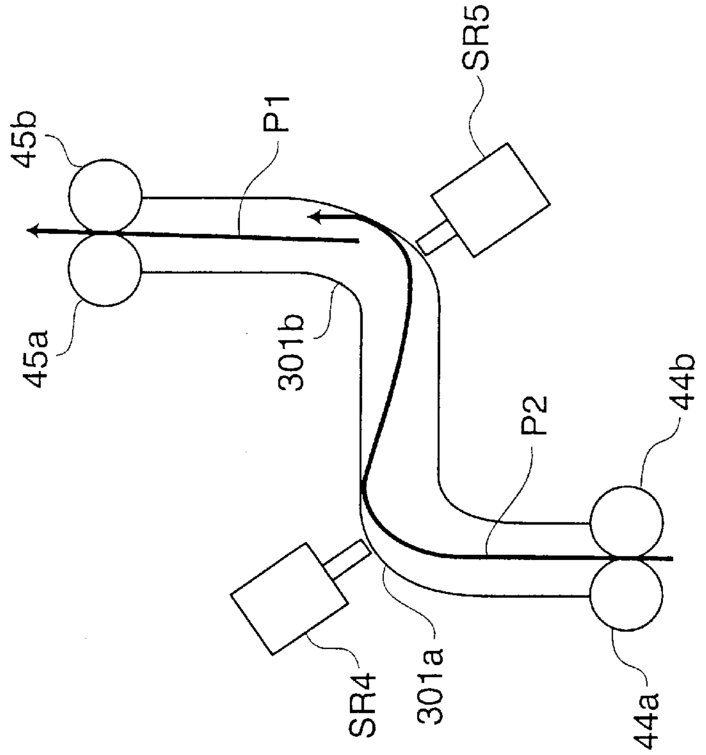

FIGS. 29 and 30 illustrate another example of construction of the paper transport unit of the above-described digital copier. In this example, the paper transport route has a first curve 301*a* and a second curve 301*b* which have predetermined curvatures and are opposed to each other. The first curve 301*a* and the second curve 301*b* are arranged between the paper feed roller 44 and the resist roller 45. A fourth paper sensor SR4 and a fifth paper sensor SR5 are disposed at the center of the first curve 301*a* and at the center of the second curve 301*b*. The paper sensors SR4 and SR5 are each composed of an optical sensor of reflection type, an optical sensor of transmission type or a mechanical switch.

The fourth paper sensor SR4 detects the arrival of the leading end of a sheet P at the first curve 301*a* and the passage of the tail end of the sheet P at the first curve 301*a*.

The fifth paper sensor SR5 detects the arrival of the leading end of the sheet P at the second curve 301*b* and the passage of the tail end of the sheet P at the second curve 301*b*.

The paper feed roller 44 is so constructed that a variable-speed transport force from a motor (not shown) is transmitted thereto. The paper feed roller 44 is composed of two paper feed roller 44*a* and 44*b* which sandwich the sheet P and transport it toward the resist roller 45.

As shown in FIG. 30(A), in the tail end multiple operation, the paper feed roller 44 and the resist roller 45 are controlled according to paper detection signals by the fourth and fifth paper sensors SR4 and SR5 so that the tail end portion of the preceding sheet P1 sandwiched by the resist roller 45 is held in contact with a lower wall between the first curve 301*a* and the second curve 301*b*, while the following sheet P2 sandwiched by the paper feed roller 44 is transported with its leading end portion being contacted with an upper wall of the first curve 301*a* until the leading end portion of the following sheet P2 reaches a pre-calculated overlap position. When the leading end portion of the sheet P2 reaches the overlap position, the transport of the sheets P1 and P2 toward the transfer position is re-started.

Thus, the preceding sheet P1 and the following sheet P2 can be transported with the leading end portion of the following sheet P2 overlapping on the tail end portion of the preceding sheet P1.

As shown in 30(B), in the leading end multiple operation, the paper feed roller 44 and the resist roller 45 are controlled according to paper detection signals by the fourth and fifth paper sensors SR4 and SR5 so that the tail end portion of the preceding sheet P1 sandwiched by the resist roller 45 is held between the second curve 301*b* and the resist roller 45, while the following sheet P2 sandwiched by the paper feed roller 44 is transported with its leading end portion being contacted with a lower wall of the second curve 301*b* until the leading end portion of the following sheet P2 reaches a pre-calculated overlap position. When the leading end portion of the following sheet P2 reaches the overlap position, the transport of the sheets P1 and P2 toward the transfer position is re-started.

Thus, the preceding sheet P1 and the following sheet P2 can be transported with the tail end portion of the preceding sheet P1 overlapping on the leaning end portion of the following sheet P2.

As described above, the tail end multiple operation and the leading end multiple operation can be selectively performed by pre-setting the position where the tail end portion of the preceding sheet P1 is held and by utilizing the two curves and the elasticity of the sheets.

The present invention has effects as described below.

(1) The data representative of the blanks on the leading end side or on the tail end side in the paper transport direction is deleted from the image data for forming images on a plurality of sheets of paper which are transported sequentially. The sheets are transported in such a manner that they partially overlap with one another in the paper transport direction by the length corresponding to the deleted data representative of blanks. Thereby, the sheets can be transported with overlapping with one another by overlap amounts determined on the basis of image ranges in the paper transport direction represented in the image data. The time period for the sheets to pass through the image forming unit can be shortened to a minimum without damage to the images formed on the sheets, that is, with original image data being faithfully reproduced on the sheets.

(2) The data representative of the blank on the tail end side is deleted from the image data for the preceding sheet and the sheets are transported to the image forming unit in such a manner that the leading end portion of the following sheet is laid on the tail end portion of the preceding sheet in the paper transport direction by the length corresponding to the deleted data representative of the blank. The blank corresponds to an area of the preceding sheet on which the following sheet lies, i.e., an area which does not face the image forming unit. By the deletion of the data representative of the blank from the image data, an image can be formed on the leading end side of each sheet as the image data represents, while the blank on the tail end side of each sheet is masked by the following sheet. The contents of data representative of the image to be formed on each sheet are not changed.

(3) The data representative of the blank on the leading end side is deleted from the image data for the following sheet and the sheets are transported to the image forming unit in such a manner that the tail end portion of the preceding sheet is laid on the leading end portion of the following sheet in the paper transport direction by the length corresponding to the deleted data representative of the blank. The blank corresponds to an area of the following sheet on which the preceding sheet lies, i.e., an area which does not face the image forming unit. By the deletion of the data representative of the blank from the image data, an image can be formed on the tail end side of each sheet as the image data represents, while the blank on the leading end side of each sheet is masked by the preceding paper. The contents of data representative of the image to be formed on each sheet are not changed.

(4) The tail end multiple operation or the leading end multiple operation is conducted according to the selective operation of an operator. Thus, the sheets can be overlapped with each other in the state selected by the operator according to a desired paper output state, the construction of the paper transport unit or the like, and the fastest image forming operation can be performed according to the desired paper output state, the construction of the paper transport unit or the like.

(5) The sheets are overlapped with one another automatically according to the state of the blanks to be formed on the sheets. The fastest image forming operation is conducted according to the image data.

(6) The overlap amount of the sheets fed from the paper accommodating section with overlapping one another by a fixed overlap amount are adjusted according to the lengths corresponding to the deleted data representative of the blanks before the sheets reach the image forming unit. Thus, the sheet can be guided to the image forming unit in a state such that the sheets are overlapped by the overlap amounts according to the image data.

(7) A proper overlap amount of the preceding and following sheets can be easily realized according to the image data when the following sheet is fed from the paper accommodating section.

(8) Sheets passing through the transfer position with overlapping with each other are separately transported to the fixing position. Thus, the sheets can be heated and pressurized in a state such that the sheets are separated from each other and consequently do not adhere to each other.

(9) Each sheet is transported faster after its tail end passes through the transfer position until its leading end reaches the fixing position than it is transported at the transfer position. Thus, the preceding sheet which passes through the transfer position with its tail end side overlapping with the following sheet, when its tail end leaves the transfer position, can be transported at a higher speed than the speed of the following sheet which is passing through the transfer position, and consequently the preceding sheet can be separated from the following sheet.

(10) Each sheet is transported faster after its tail end passes through the transfer position until its leading end reaches the fixing position than it is transported at the transfer position, according to the overlap amount with the following sheet. Thus, each sheet can be surely separated from the following sheet from its passage through the transfer position to its arrival at the fixing position.

(11) In this construction, the vertical paper feed position from the paper accommodating section is controlled according to the selection of the tail end multiple operation or the leading end multiple operation. Thus, the sheets can be fed downward or upward according to the selected operation, so that a space to which the leading end portion of the following sheet is guided can be formed above or below the tail end portion of the preceding sheet.

(12) The leading end portion of the following sheet is guided above or below the tail end portion of the preceding sheet according to the selection of the tail end multiple operation or the leading end multiple operation. Thus, the tail end portion of the preceding sheet and the leading end portion of the following sheet can be overlapped in a state suitable for the selected operation.

(13) The tail end portion of the preceding sheet is shifted to an upper position or to a lower position when the following sheet is fed from the paper accommodating section, according to the selection of the tail end multiple operation or the leading end multiple operation. Thus, a space to which the leading end portion of the following sheet is guided can be formed above or below the tail end portion of the preceding sheet according to the selected operation, and the preceding sheet and the following sheet can be overlapped in a state suitable for the selected operation.

(14) The leading end portion of the following sheet fed from the paper accommodating section is shifted to an upper position or to a lower position according to the selection of the tail end multiple operation or the leading end multiple operation. Thus, the leading end portion of the following sheet can be surely guided above or below the tail end portion of the preceding sheet according to the selected operation.

(15) The sheets continuously fed from the paper accommodating section are guided sequentially to the separate transport routes, transported via the separate transport routes and then overlapped before the image forming unit according to the selection of the tail end multiple operation or the leading end multiple operation. Thus, the sheets can be transported to the image forming unit with overlapping suitably for the selected operation. Also the intervals of feeding the sheet can be sufficiently shortened and consequently the image forming operation time can be decreased.

(16) The overlap member disposed between the separate transport routes and the image forming unit moves the tail end portion of the preceding sheet below or above the leading end portion of the following sheet, according to the selection of the tail end multiple operation or the leading end multiple operation. Thus, sequential sheets transported via the separate transport routes are guided to the image forming unit with accurately overlapping suitably for the selected operation.

(17) The leading end portion of the following sheet can be overlapped with the tail end portion of the preceding sheet by holding the tail end portion of the preceding sheet near the curve of the transport route and utilizing the elasticity of the sheets near the curve.

(18) By changing the position of holding the tail end portion of the preceding sheet near the curve and utilizing the elasticity of the sheets near the curve, it is possible to hold the tail end portion of the preceding sheet in contact with the upper side of the curve and position the tail end portion of the preceding sheet below the leading end portion of the following sheet, or alternately it is possible to hold the tail end portion of the preceding sheet in contact with the lower side of the curve and position the leading end portion of the following sheet above the tail end portion of the preceding sheet.

(19) It is possible to shorten the time for overlapping the tail end portion of the preceding sheet with the leading end portion of the following sheet and improve the accuracy in an overlap position.

(20) It is possible to adjust the position of overlapping the tail end portion of the preceding sheet with the leading end portion of the preceding sheet.

(21) The image data received via the network, like image data read from an original document, can be output on sheets of paper by transporting the sheets fed from the paper accommodating section with overlapping the tail end portion of the preceding sheet with the leading end portion of the following sheet.

What is claimed is:

1. An image forming apparatus comprising:

an image forming unit;

a paper transport unit; and a control unit for supplying the image forming unit with image data for a plurality of pages so that the image forming unit forms images page by page on sheets transported by the paper transport unit, wherein, when the image data for each page includes data representative of blanks on a leading end side and on a tail end side of the page in a paper transport direction, the control unit deletes the data representative of the blank either on the leading end side or on the tail end side from the image data prior to supplying the image forming unit with the image data, and controls the paper transport unit so that a plurality of sheets are transported sequentially to the image formation unit in a multiple state in which one sheet partially overlaps with another in the paper transport direction by a length corresponding to the deleted data representative of the blank.

2. An image forming apparatus according to claim 1, wherein the control unit conducts a tail end multiple operation in which the control unit deletes, from the image data, the data representative of the blank on the tail end side of a preceding one of two sequential pages prior to supplying the image forming unit with the image data, and the sheets are transported so that a leading end portion of a following one of two sheets supplied sequentially lies on a tail end portion of a preceding one.

3. An image forming apparatus according to claim 1, wherein the control unit conducts a leading end multiple operation in which the control unit deletes, from the image data, the data representative of the blank on the leading end side of a following one of two sequential pages prior to supplying the image forming unit with the image data, and the sheets are transported so that a tail end portion of a preceding one of two sheets supplied sequentially lies on a leading end portion of a following one.

4. An image forming apparatus according to claim 1, wherein, according to a selective operation, the control unit conducts either a tail end multiple operation in which the control unit deletes, from the image data, the data representative of the blank on the tail end side of a preceding one of two sequential pages prior to supplying the image forming unit with the image data, and the sheets are transported so that a leading end portion of a following one of two sheets supplied sequentially lies on a tail end portion of a preceding one or a leading end multiple operation in which the control unit deletes, from the image data, the data representative of the blank on the leading end side of a following one of two sequential pages prior to supplying the image forming unit with the image data, and the sheets are transported so that a tail end portion of a preceding one of two sheets supplied sequentially lies on a leading end portion of a following one.

5. An image forming apparatus according to claim 1, wherein, according to a state of the blanks formed in each page, the control unit selectively conducts either a tail end multiple operation in which the control unit deletes, from the image data, the data representative of the blank on the tail end side of a preceding one of two sequential pages prior to supplying the image forming unit with the image data, and the sheets are transported so that a leading end portion of a following one of two sheets supplied sequentially lies on a tail end portion of a preceding one or a leading end multiple operation in which the control unit deletes, from the image data, the data representative of the blank on the leading end side of a following one of two sequential pages prior to supplying the image forming unit with the image data, and the sheets are transported so that a tail end portion of a preceding one of two sheets supplied sequentially lies on a leading end portion of a following one.

6. An image forming apparatus according to claim 1, wherein the paper transport unit comprises a paper feed member for feeding the sheets from a paper accommodating section with one sheet overlapping with another and an adjusting member for adjusting an overlap amount of the sheets between the paper accommodating section and the image forming unit, and the control unit operates the adjusting member according to the length in the paper transport direction corresponding to the deleted data representative of the blank.

7. An image forming apparatus according to claim 1 further comprising a separative transport member in the image forming unit, the separative transport member being provided between a transfer position where an image is transferred onto the sheets and a fixation position where the sheets having passed through the transfer position are heated and pressurized, for separating and transporting the sequentially transported sheets one by one.

8. An image forming apparatus according to claim 7, wherein the separative transport member transports each sheet at a paper transport speed faster than that at the transfer position after the tail end of the sheet passes through the transfer position until the leading end of the sheet reaches the fixation position.

9. An image forming apparatus according to claim 7, wherein the separative transport member changes the paper transport speed after the tail end of the sheet passes through the transfer position until the leading end of the sheet reaches the fixation position according to the length in the paper transport direction corresponding to the deleted data representative of the blank.

10. An image forming apparatus according to claim 5, wherein the paper transport unit comprises a paper feed position control member for controlling a vertical position of feeding the sheets from the paper accommodating section according to the selection of the tail end multiple operation or the leading end multiple operation.

11. An image forming apparatus according to claim 10, wherein the paper feed position control member selectively guides the leading end portion of the following sheet from the paper accommodating section above or below the tail end portion of the preceding sheet according to the selection of the tail end multiple operation or the leading end multiple operation.

12. An image forming apparatus according to claim 11, wherein the paper feed position control member moves upward or downward the tail end portion of the preceding sheet when the following sheet is fed out of the paper accommodating section according to the selection of the tail end multiple operation or the leading end multiple operation.

13. An image forming apparatus according to claim 11, wherein the paper feed position control member moves upward or downward the leading end portion of the following sheet when the following sheet is fed out of the paper accommodating section according to the selection of the tail end multiple operation or the leading end multiple operation.

14. An image forming apparatus according to claim 10, wherein the paper transport unit forms at least two separate transport routes separate to each other between the paper accommodating section and the image forming unit, a separation claw is provided between the separate transport routes and the paper accommodation section for guiding the sheets alternately to the separate transport routes, and an overlap member is provided between the separate transport routes and the image forming unit for guiding the leading end of a sheet passing through one separate transport route above or below the tail end of a sheet passing through another separate transport route according to the selection of the tail end multiple operation or the leading end multiple operation.

15. An image forming apparatus according to claim 14, wherein the overlap member pushes down the tail end portion of the preceding sheet transported via one separate transport route below the leading end portion of the following sheet transported via another separate transport route in the case where the tail end multiple operation is selected, and pushes up the tail end portion of the preceding sheet transported via one separate transport route above the leading end portion of the following sheet transported via another separate transport route in the case where the leading end multiple operation is selected.

16. An image forming apparatus according to claim 5, wherein the paper transport unit comprises a transport route formed with at least one curve having a predetermined curvature between the paper accommodation section and the image forming unit and provided with paper transport rollers on a paper accommodating section side and on an image forming section side of the transport route and a paper sensor disposed at the center of the curve of the transport route, and the control unit controls drive and stop of the transport rollers so that the tail end of the preceding sheet fed out of the paper accommodating section previously is stopped near the curve of the transport route and the leading end portion of the following sheet fed out of the paper accommodating section next is guided above or below the tail end portion of the preceding sheet.

17. An image forming apparatus according to claim 16, wherein the control unit controls the drive and stop of the transport rollers so as to change a position of stopping the tail end portion of the preceding sheet near the curve of the transport route according to the selection of the tail end multiple operation or the leading end multiple operation.

18. An image forming apparatus according to claim 16, wherein the control unit varies a rotational speed of the transport roller on the paper accommodation section side according to a state of the blank formed on each page and a result detected by the paper sensor.

19. An image forming apparatus according to claim 16, wherein the control unit rotates the transport roller on the paper accommodation section side reversibly according to the state of the blank formed on each page and the result detected by the paper sensor.

20. An image forming apparatus according to claim 1 further comprising a communication section for sending and receiving the image data, positional data thereof and copying conditions thereof to and from an external terminal via a network.

* * * * *